(12) United States Patent
Blew

(10) Patent No.: US 8,662,911 B2
(45) Date of Patent: Mar. 4, 2014

(54) COAXIAL CONNECTORS INCLUDING CONDUCTIVE ANTI-FRICTION BEARING MECHANISMS AND/OR LOCKING MECHANISMS AND RELATED METHODS

(75) Inventor: Douglas Blew, Mooresville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 236 days.

(21) Appl. No.: 13/241,790

(22) Filed: Sep. 23, 2011

(65) Prior Publication Data

US 2013/0078856 A1 Mar. 28, 2013

(51) Int. Cl.
*H01R 4/38* (2006.01)
(52) U.S. Cl.
USPC .......................................................... 439/322
(58) Field of Classification Search
USPC .......................... 439/578, 583–585, 320, 322
See application file for complete search history.

(56) References Cited

U.S. PATENT DOCUMENTS

| 1,712,301 | A | * | 5/1929 | Glidden | 439/17 |
|---|---|---|---|---|---|
| 2,715,713 | A | * | 8/1955 | Seim | 439/17 |
| 3,581,267 | A | * | 5/1971 | Schreffler | 439/3 |
| 4,709,311 | A | * | 11/1987 | Bornhorst | 362/277 |
| 4,801,274 | A | * | 1/1989 | Royce | 439/322 |
| 4,869,687 | A | * | 9/1989 | Johnson | 439/470 |
| 5,653,605 | A | * | 8/1997 | Woehl et al. | 439/321 |
| 6,557,900 | B1 | * | 5/2003 | Austin | 285/92 |
| 6,716,062 | B1 | | 4/2004 | Palinkas | |
| 7,032,931 | B2 | * | 4/2006 | Austin | 285/92 |
| 7,086,897 | B2 | | 8/2006 | Montena | |
| 7,566,236 | B2 | | 7/2009 | Malloy et al. | |
| 7,740,502 | B2 | | 6/2010 | Blew et al. | |
| 7,824,216 | B2 | | 11/2010 | Purdy | |
| 7,833,053 | B2 | | 11/2010 | Mathews | |
| 7,892,005 | B2 | | 2/2011 | Haube | |
| 8,029,315 | B2 | | 10/2011 | Purdy et al. | |
| 8,123,554 | B2 | * | 2/2012 | Leipold et al. | 439/578 |
| RE43,832 | E | * | 11/2012 | Malloy et al. | 439/321 |
| 8,376,769 | B2 | * | 2/2013 | Holland et al. | 439/322 |
| 2008/0248689 | A1 | | 10/2008 | Montena | |
| 2010/0255719 | A1 | | 10/2010 | Purdy | |
| 2010/0297875 | A1 | | 11/2010 | Purdy et al. | |
| 2011/0143567 | A1 | | 6/2011 | Purdy et al. | |
| 2011/0230089 | A1 | | 9/2011 | Amidon et al. | |
| 2012/0129387 | A1 | * | 5/2012 | Holland et al. | 439/578 |

* cited by examiner

*Primary Examiner* — Neil Abrams
*Assistant Examiner* — Travis Chambers
(74) *Attorney, Agent, or Firm* — Myers Bigel Sibley & Sajovec

(57) ABSTRACT

Coaxial connectors are provided that include a body assembly, an internally-threaded nut, and a conductive anti-friction bearing mechanism disposed between the body assembly and the nut. In some embodiments, the conductive anti-friction bearing mechanism may comprise a plurality of ball bearings that are configured to maintain an electrical connection between the body assembly and the internally-threaded nut.

21 Claims, 27 Drawing Sheets

COAXIAL CONNECTORS INCLUDING CONDUCTIVE ANTI-FRICTION BEARING MECHANISMS AND/OR LOCKING MECHANISMS AND RELATED METHODS

FIELD OF THE INVENTION

The present invention relates to communications connectors and, more particularly, to connectors for coaxial cables.

BACKGROUND

A coaxial cable is a known type of electrical cable that may be used to carry radio frequency ("RF") signals. Coaxial cables are widely used as transmission lines in cable television networks and/or to provide broadband Internet connectivity. Coaxial cables are also used in a wide variety of other applications such as, for example, interconnecting electrical equipment, connecting electrical equipment to antennas and the like. FIG. 1 is a perspective view of a conventional coaxial cable 10 that has been partially cut apart to reveal its internal structure. As shown in FIG. 1, the coaxial cable 10 has a central conductor 12 that is surrounded by a dielectric insulator 14. A tape 16 may be bonded to the outside surface of the dielectric insulator 14. A metallic electrical shield 18 such as braided shielding wires surrounds the central conductor 12, dielectric insulator 14 and tape 16. One or more electrical shielding tapes (not shown in FIG. 1) may surround the metallic electrical shield 18. The central conductor 12, dielectric insulator 14, tape 16, electrical shield 18 and any electrical shielding tape are enclosed within a protective cable jacket 20.

The central conductor 12 of coaxial cable 10 may comprise, for example, a copper wire, a copper clad aluminum wire or a copper clad steel wire. The central conductor 12 is designed to carry RF signals. Typically, a conductor such as central conductor 12 that carries RF or other high frequency signals can also act as an antenna, and thus some of the signal energy is radiated from the conductor, resulting in signal loss or "attenuation." Coaxial cables are designed to reduce such signal attenuation by placing the electrical shield 18 (which is connected to a ground reference) around the central conductor 12. As a result of this arrangement, the electromagnetic field of the RF signal that is carried by the central conductor 12 is generally trapped in the space inside the electrical shield 18, thereby greatly reducing signal radiation and associated signal attenuation losses.

Typically, each end of a coaxial cable is terminated with a coaxial connector. The most common type of coaxial connectors are referred to in the art as "F-style" coaxial connectors. Female F-style coaxial connectors, which are often referred to as "connector ports" are commonly mounted on wall plates in homes and on various devices such as televisions, cable modems, signal amplifiers, tap units, ground blocks, etc. A typical female F-style connector port comprises an externally threaded cylindrical housing that includes an aperture on one end thereof that is configured to receive a protruding central conductor of a male F-style coaxial connector. A typical male F-style coaxial connector includes an internally-threaded nut which is threaded onto the externally-threaded housing of the female F-style coaxial connector port. A coaxial cable that includes a coaxial connector on at least one end thereof is referred to herein as a "terminated coaxial cable." Terminated coaxial cables are used in a wide variety of applications including use as jumper cables, internal cabling within buildings, drop cables and the like.

FIG. 2 is a perspective view of a conventional male F-style coaxial connector 30. FIG. 3 is a side cross-sectional view of the male F-style coaxial connector 30 of FIG. 2. FIG. 4 illustrates the connector 30 of FIGS. 2-3 after it has been attached to an end of a coaxial cable 10.

As shown in FIGS. 2-4, the F-style coaxial connector 30 includes a body assembly 32, a compression sleeve 36 and an internally-threaded nut 38. The body assembly 32 includes a tubular connector body 33 and a contact post 34. In FIG. 2, the compression sleeve 36 is depicted in its "unseated" position in which it may receive a coaxial cable 10 that is to be terminated into the coaxial connector 30.

When the compression sleeve 36 of coaxial connector 30 is in its unseated position of FIG. 2, a coaxial cable such as cable 10 may be prepared and then inserted axially into the compression sleeve 36 and the body assembly 32. The central conductor 12, dielectric insulator 14 and tape 16 (coaxial cable 10 is not depicted in FIGS. 2-3 to more clearly show the structure of the connector 30) are inserted axially into the inside diameter of the contact post 34, while the electrical shield 18, and the cable jacket 20 are inserted inside the tubular connector body 33 so as to circumferentially surround the outer surface of the contact post 34. The outside surface of the contact post 34 may include one or more serrations, teeth, lips or other retention structures 35 (see FIG. 3). Once the coaxial cable 10 is inserted into the coaxial connector 30 as described above, a compression tool may be used to forcibly axially insert the compression sleeve 36 further into the tubular connector body 33 into its "seated" position (see FIG. 4). Moving the compression sleeve 36 into its seated position decreases the radial gap between the tubular connector body 33 and the contact post 34 so as to radially impart a generally 360-degree circumferential compression force on the electrical shield 18 and the cable jacket 20 that circumferentially surround the outer surface of contact post 34. This compression, in conjunction with the retention structures 35 on the outside surface of the contact post 34, applies a retention force to the coaxial cable 10 that firmly holds the coaxial cable 10 within the coaxial connector 30. As shown in FIG. 4, the central conductor 12 of the coaxial cable 10 extends into the internal cavity of the internally-threaded nut 38 to serve as the male protrusion of the coaxial connector 30.

As noted above, male F-style coaxial connectors are used to mechanically and electrically attach a coaxial cable such as coaxial cable 10 to a female connector port such as, for example, a standard coaxial cable wall outlet or a port on a signal amplifier, tap unit, television set, cable modem, etc. FIG. 5 is a perspective view of a conventional F-style female connector port 40. As shown in FIG. 5, the female connector port 40 may comprise a cylindrical housing 41 that has a plurality of external threads 42. The distal face 44 of the cylindrical housing 41 includes an aperture 46. A central conductor 48 (barely visible in FIG. 5) runs longitudinally through the center of the female connector port 40. The internally-threaded nut 38 of a mating male coaxial connector 30 is inserted over, and threaded onto the external threads 42 of the female connector port 40 so that the central conductor 12 of the coaxial cable 10 that is attached to the coaxial connector 30 is received within the aperture 46. The central conductor 48 of female connector port 40 is configured to receive the central conductor 12 of the mating male F-style coaxial connector 30, thereby electrically connecting the central conductors 12, 48. Once the internally-threaded nut 38 is fully threaded onto the external threads 42 of the female connector port 40, the distal face 44 of the female connector port 40 is brought into mechanical and electrical contact with the base of the contact post 34, thereby providing an electrical ground plane connection between the body assembly 32 of coaxial connector 30 and the housing 41 of the female connector port 40.

SUMMARY

Pursuant to embodiments of the present invention, coaxial connectors are provided that include a body assembly, a nut, and a conductive anti-friction bearing mechanism disposed between the body assembly and the nut.

In some embodiments, the conductive anti-friction bearing mechanism includes a plurality of roller bearings such as, for example, ball bearings or cylindrical bearings. In other embodiments, the conductive anti-friction bearing mechanism includes one or more sliding plane bearings. In some embodiments, the conductive anti-friction bearing mechanism may include a retainer that positions at least one of the bearings in a desired position or at a desired spacing from other bearings. In some embodiments, at least one of the body assembly and the nut may include a plurality of roller bearing retention cavities, and the roller bearings may be received within respective ones of the roller bearing retention cavities. In some embodiments, at least one of the body assembly and the nut may include a groove, and the plurality of roller bearings may be at least partly received within the groove. The coaxial connector may also include a locking mechanism that is configured to resist rotation of the nut once the nut is firmly threaded onto a mating female connector port. The locking mechanism may comprise, for example, a plurality of depressions in a surface of the body assembly and/or the nut that are configured to receive respective ones of the roller bearings once the nut is firmly threaded onto a mating female connector port.

In some embodiments, the nut may include an internal set of threads and an annular internal ring. The conductive anti-friction bearing mechanism may be positioned between the annular internal ring and the internal set of threads. The connector may also include a moisture seal element, and the annular internal ring may be positioned between the conductive anti-friction bearing mechanism and this moisture seal element. The coaxial connector may be mounted on a coaxial cable to provide a terminated coaxial cable.

Pursuant to further embodiments of the present invention, coaxial connectors are provided that include a body assembly that includes a connector body and a contact post that is positioned at least partly within the connector body. The coaxial connector further includes an internally-threaded nut that is mounted to extend from the body assembly. The internally threaded nut is configured to rotate independent of the body assembly. The connector may further include a locking mechanism that includes a plurality of elements disposed between the internally-threaded nut and the body assembly. The plurality of elements are configured to lock within respective depressions in at least one of an inner surface of the internally-threaded nut or an outer surface of the body assembly when the internally-threaded nut is firmly threaded onto a mating female connector port. In some embodiments, the plurality of elements comprise roller bearings. For example, the roller bearings may be a plurality of ball bearings that are positioned within a retainer. The depressions may be partially spherical depressions.

Pursuant to further embodiments of the present invention, methods of providing an electrical ground plane conduction path through a coaxial connector that includes a body assembly and an internally-threaded nut are provided. Pursuant to these methods, a conductive anti-friction bearing mechanism is provided between the body assembly and the internally-threaded nut that provides a continuous electrical connection between the body assembly and the nut, the electrical connection being part of the ground plane conduction path.

DETAILED DESCRIPTION

Embodiments of the present invention are directed to male coaxial connectors that include anti-friction bearing mechanisms that facilitate maintaining the electrical connection between the male coaxial connector and a mating female connector port even if the male coaxial connector becomes loosened from the female connector port. Embodiments of the present invention are also directed to male coaxial connectors that include locking mechanisms that resist loosening of the male coaxial connectors from a mating female connector port. Some of the coaxial connectors disclosed herein may include both an anti-friction bearing mechanism and a locking mechanism.

As used herein, the term "longitudinal" and derivatives thereof refer to the direction defined by the central axis of the coaxial connector, which is generally coexistent with the central axis of any coaxial cable that the coaxial connector is installed on when the coaxial cable is fully extended in a straight line. This direction may also be referred to herein as the "axial" direction. The term "transverse" and derivatives thereof refer to the plane that is normal to the longitudinal direction. Herein, the terms "front", "front end" and derivatives thereof when used with respect to a male coaxial connector refer to the end of the male coaxial connector that mates with a female connector port. Thus, the "front" or "front end" of a male coaxial connector refers to the end of the connector that includes a protruding center conductor that is inserted into a mating female connector port. References herein to the "rear" or "rear end" of a male coaxial connector refer to the end of the coaxial connector that is opposite the front end.

Figure 6:
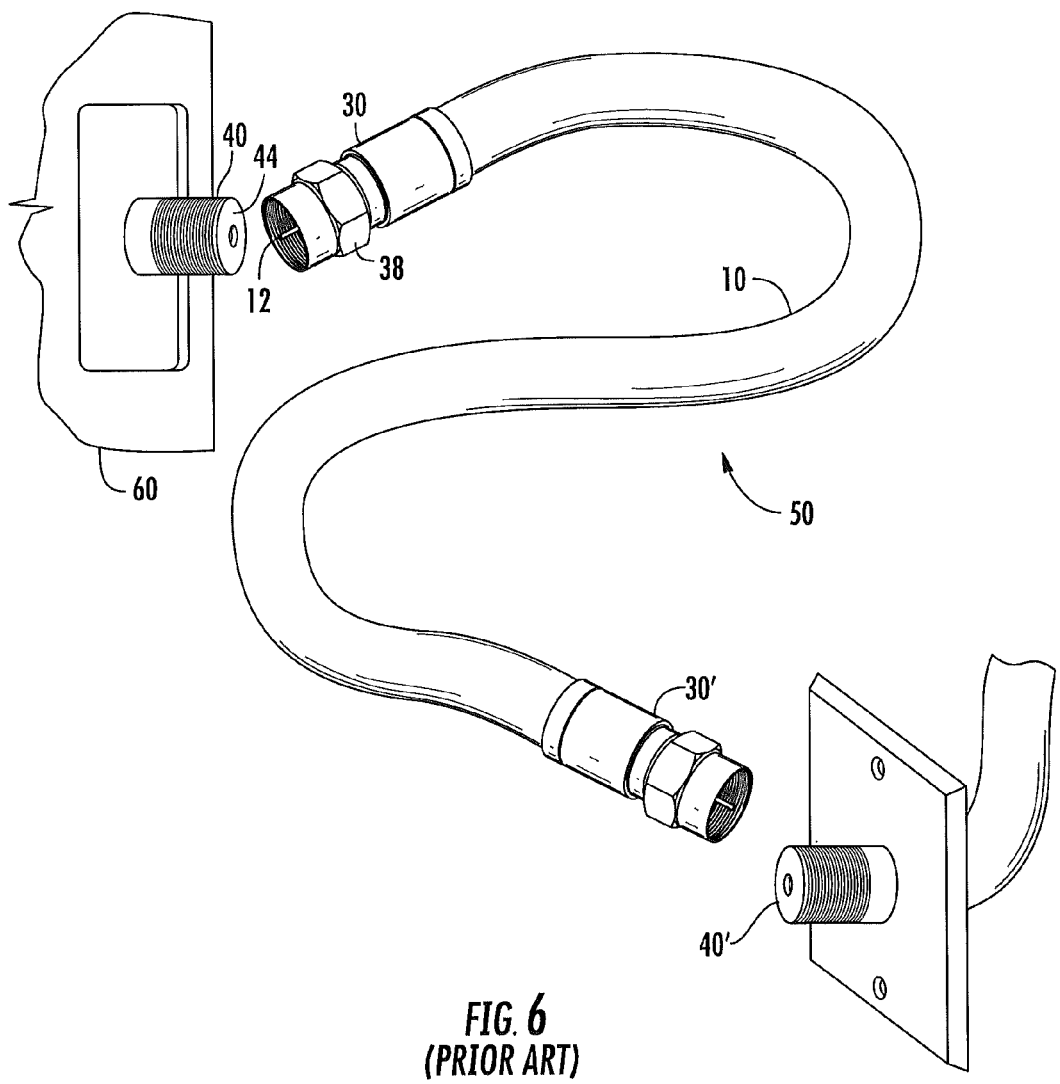
FIG. 6 is a schematic diagram illustrating how a coaxial jumper cable may be used to electrically connect a device to a wall outlet.

As noted above, terminated coaxial cables are used throughout a cable network to carry cable television, broadband Internet, digital telephone and other RF signals between the head end facilities of the cable service provider and individual electronic devices such as television sets, cable modems, digital video recorders and the like that are located in end user premises. FIG. 6 illustrates how a terminated coaxial cable 50 (which in the example of FIG. 6 comprises a jumper cable) may be used to connect a first female connector port 40 that is provided on an end device 60 such as a television set or a cable modem to a second female connector port 40' that is mounted on a wall outlet. The terminated coaxial cable 50 comprises a coaxial cable 10 that has male F-style coaxial connectors 30 and 30' mounted on the respective ends thereof.

Figure 3:
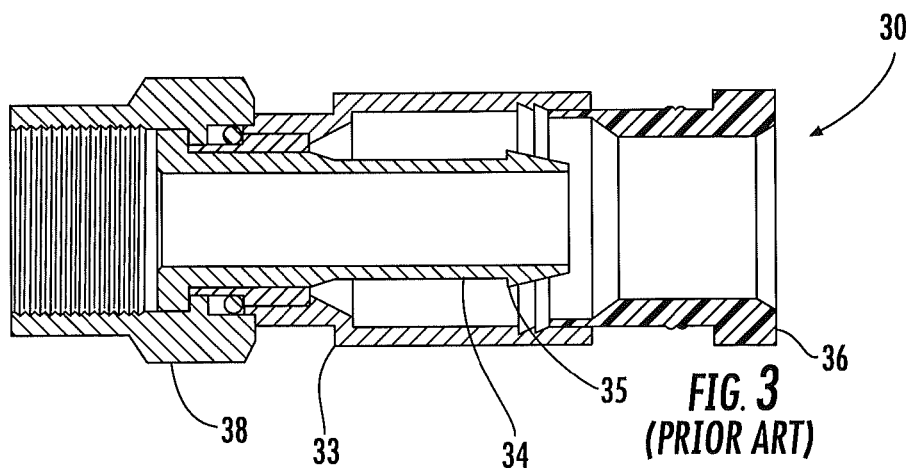
FIG. 3 is a side cross-sectional view of the conventional F-style coaxial connector of FIG. 2.
Figure 5:
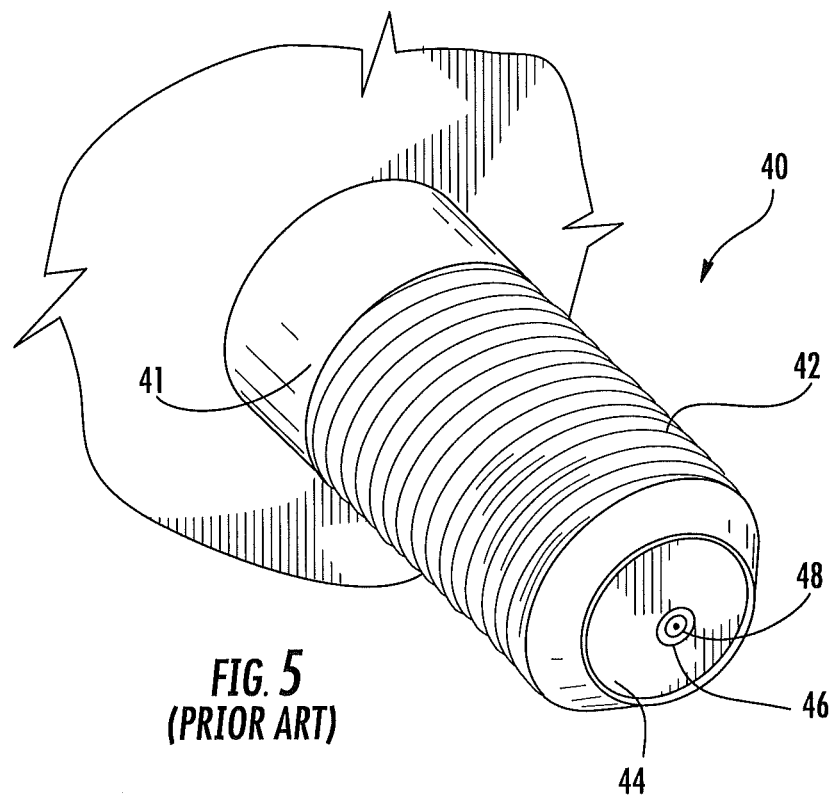
FIG. 5 is a perspective view of a conventional female connector port.

When, for example, the coaxial connector 30 is mounted on the female connector port 40, the center conductor 12 of coaxial connector 30 is received within the prongs of the central conductor 48 (see FIG. 5) of female connector port 40, thereby establishing a first electrical connection between the coaxial connector 30 and the female connector port 40 (herein "the signal carrying path"). Once the internally-threaded nut 38 of coaxial connector 30 is firmly tightened onto the female connector port 40, the distal face 44 of the female connector port 40 comes into both mechanical and electrical contact with the base of the contact post 34 (see FIG. 3) of coaxial connector 30. As the electrical shield 18 of the coaxial cable 10 directly contacts the other side of the base of the contact post 34, and as the contact post 34 is made of a conductive material, an electrical connection is provided between the electrical shield 18 and the distal face 44 of the conductive housing 41 of the female connector port 40 via the contact post 34. This electrical connection provides a second conductive path between the coaxial cable 10 and the female connector port 40 that is used to carry the ground reference (herein "the ground plane conduction path"). A secondary, indirect ground plane conduction path may also be provided from the contact post 34 to the housing 41 of female connector port 40 through the threaded connection between nut 38 and housing 41, as the contact post 34 may be in electrical contact with nut 38 either directly and/or through the tubular connector body 33 (so long as the tubular connector body 33 is formed of a conductive material).

Various forces may be applied to the coaxial connectors 30 that are mounted on the end of the terminated coaxial cable 50 as a result of, for example, movement of the end device 60, vibrations, thermal cycling, rotational forces and the like. These forces can loosen the threaded connection between, for example, the coaxial connector 30 and the female connector port 40. By way of example, if the end device 60 in FIG. 6 comprises a television set that is mounted on a swiveled base, the swivel movements that will be applied to the television set during normal use can, over time, cause the internally-threaded nut 38 on the coaxial connector 30 to start unthreading or "loosening" from the female connector port 40. Unfortunately, when this occurs, the ground plane conduction path can be degraded or lost for several reasons.

First, as the internally-threaded nut 38 unthreads, the above described primary ground plane conduction path between the contact post 34 of coaxial connector 30 and the distal face 44 of the female connector port housing 41 may be degraded or lost because the distal face 44 separates from the base of the contact post 34, thereby breaking the primary ground plane conduction path from the contact post 34 to the housing 41. Second, as the internally-threaded nut 38 loosens, the connection between the threads of nut 38 and the threads 42 of female connector port 40 may also degrade, as the threads in a loosened connection may no longer be firmly pressed against each other so as to provide a strong contact force. This may cause degradation of the secondary ground plane conduction path. Third, as the nut 38 loosens, the connection between the nut 38 and the body assembly 32 also may become less reliable. This occurs because the nut 38 is not press-fit onto the body assembly 32, but instead is merely captured so as to be attached to the body assembly 32 such that the nut 38 may rotate freely about the body assembly 32. When the nut 38 is tightly threaded onto a mating female connector port 40, the back end of the nut 38 is forced into firm contact with the body assembly 32. However, as the nut 38 loosens, this firm contact is eventually lost, and hence the electrical connection between the body assembly 32 and the internally-threaded nut 38 may be degraded and/or even lost once the nut 38 is no longer firmly tightened onto the female connector port 40. This may also cause degradation or loss of the secondary ground plane conduction path. Thus, as the nut 38 becomes unthreaded from female connector port 40, both the primary and secondary ground plane conduction paths may be degraded or lost, with a corresponding degradation or loss of the RF signal. Even a relatively small amount of loosening of the internally-threaded nut 38 can result in degradation or loss of one or both ground plane conduction paths in many conventional coaxial connectors.

Pursuant to some embodiments of the present invention, coaxial connectors (and terminated coaxial cables that include such coaxial connectors) are provided which may include anti-friction bearing mechanisms that may maintain a good electrical connection between the body assembly of the coaxial connector and the conductive housing of a mating female connector port, even when the internally-threaded nut of the coaxial connector is not fully threaded onto the female connector port. These anti-friction bearing mechanisms may provide this improved electrical connection between the body assembly and the internally-threaded nut while still allowing the nut to rotate freely with respect to the body assembly. As a result, the secondary ground plane conduction path may be maintained, even if the nut has loosened to a degree from the connector port.

Figure 7:
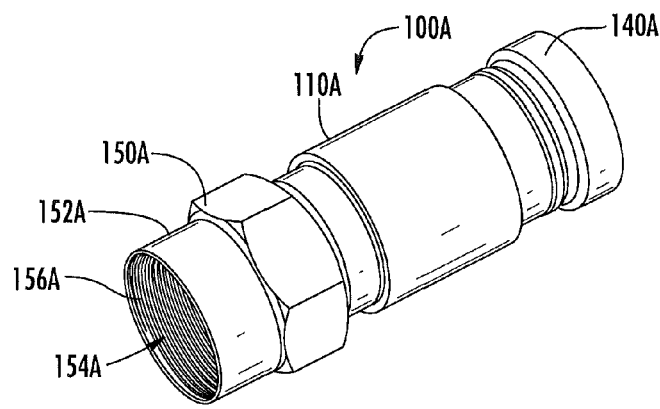
FIG. 7 is a perspective view of a coaxial connector according to embodiments of the present invention.
Figure 8:
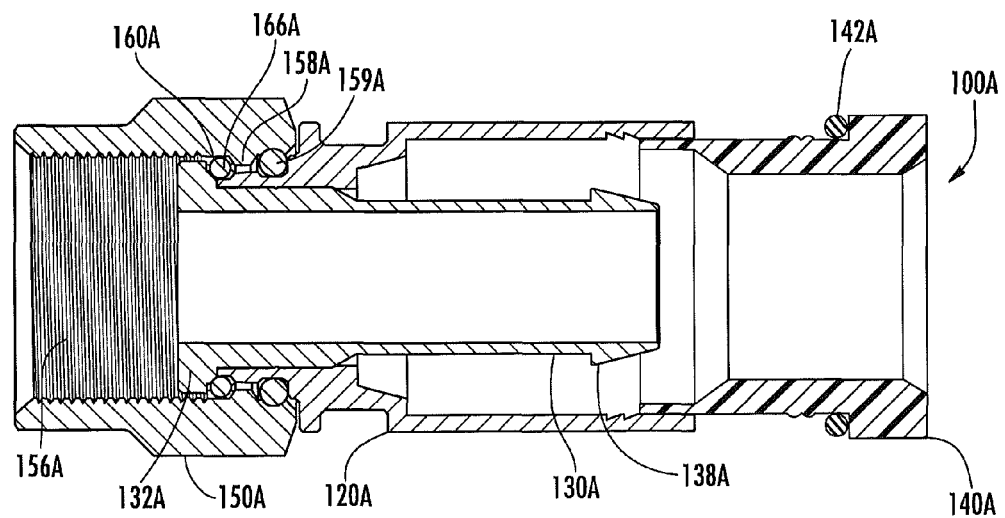
FIG. 8 is a cross-sectional view of the coaxial connector of FIG. 7.
Figure 9:
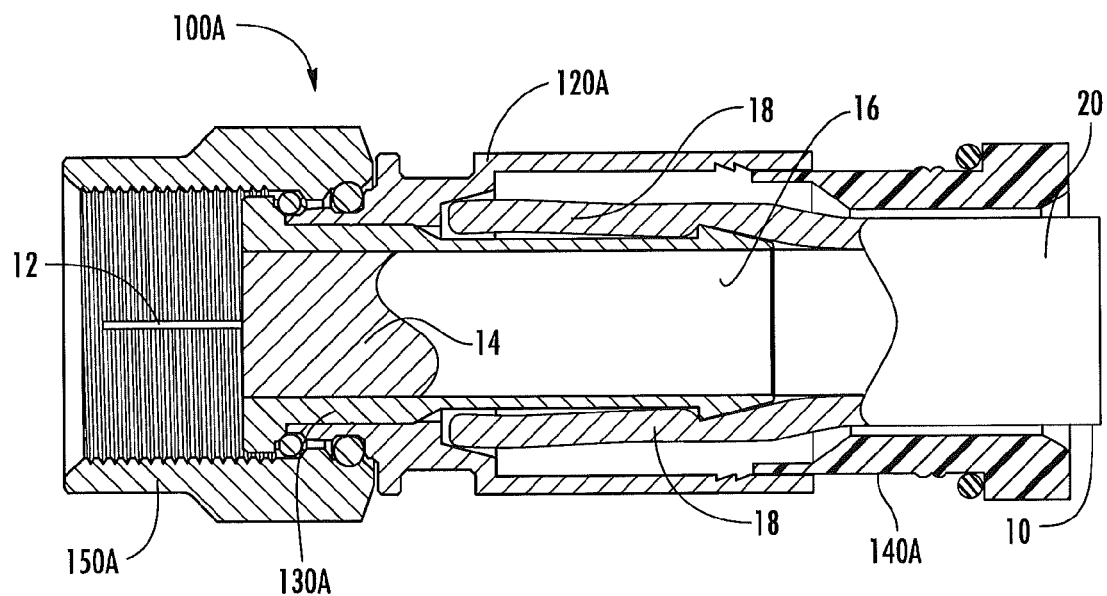
FIG. 9 is a cross-sectional view of the coaxial connector of FIG. 7 after it has received a coaxial cable such as the coaxial cable of FIG. 1, but before a compression element of the coaxial connector has been moved into its seated position.
Figure 10:
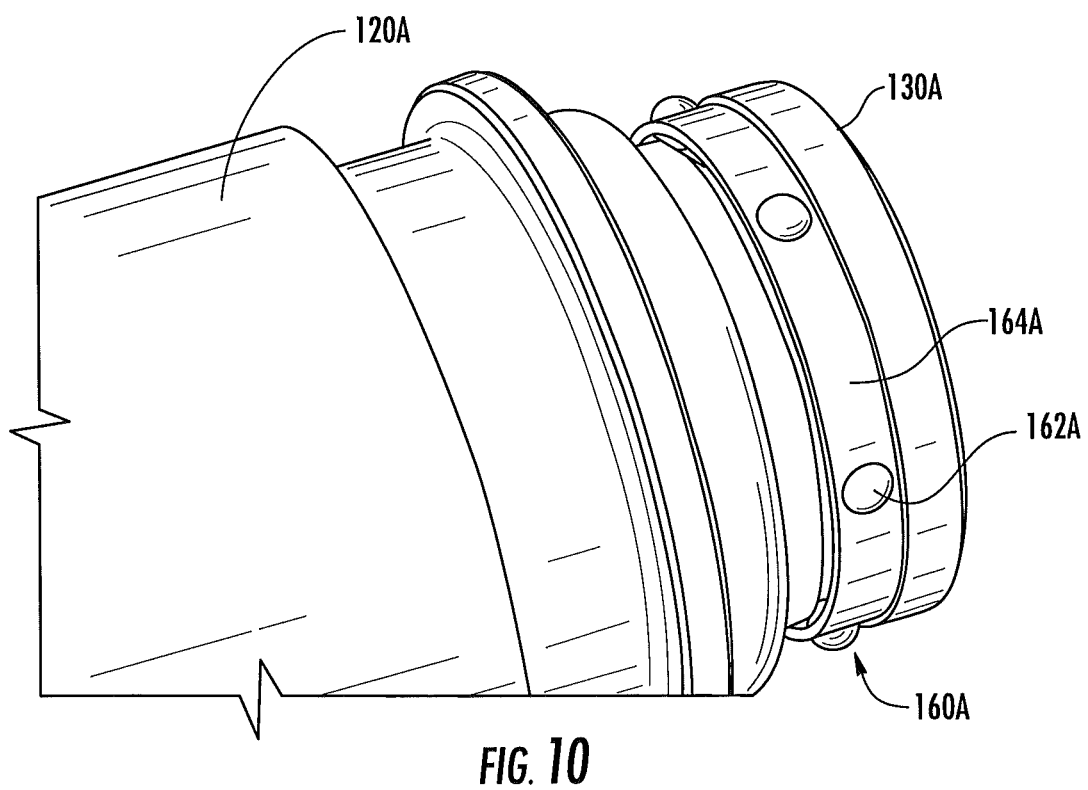
FIG. 10 is an enlarged, partial perspective view of the body assembly of the coaxial connector of FIG. 7 that illustrates an anti-friction bearing mechanism thereof.
Figure 11:
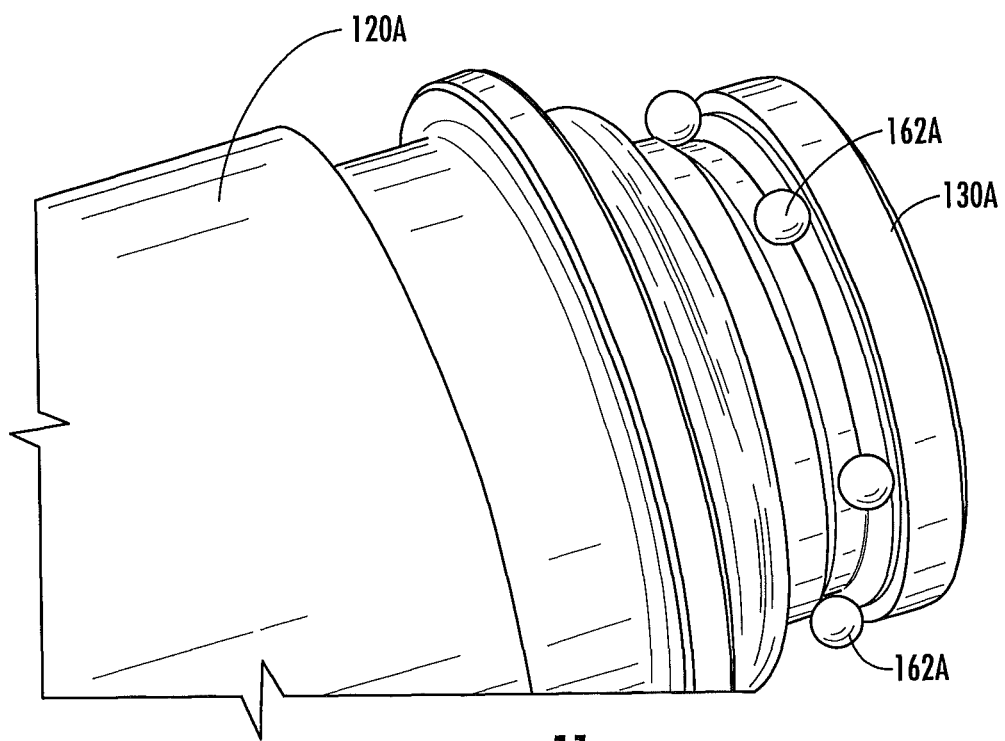
FIG. 11 is an enlarged, partial perspective view of the body assembly of the coaxial connector of FIG. 7 with a bearing retainer of the anti-friction bearing mechanism removed to more clearly illustrate the individual bearings.
Figure 12:
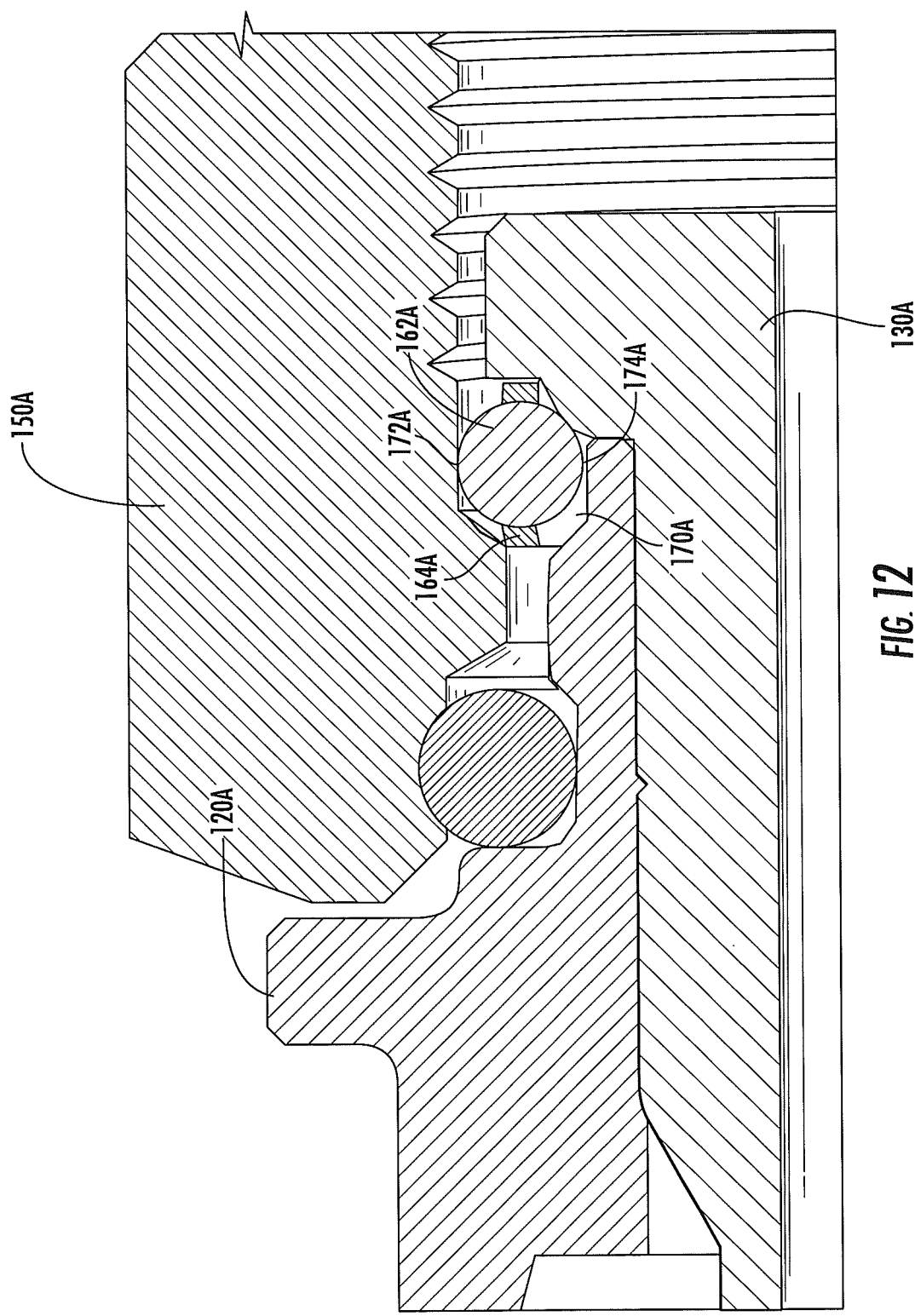
FIG. 12 is a greatly enlarged partial cross-sectional view of the coaxial connector of FIG. 7.
Figure 13:
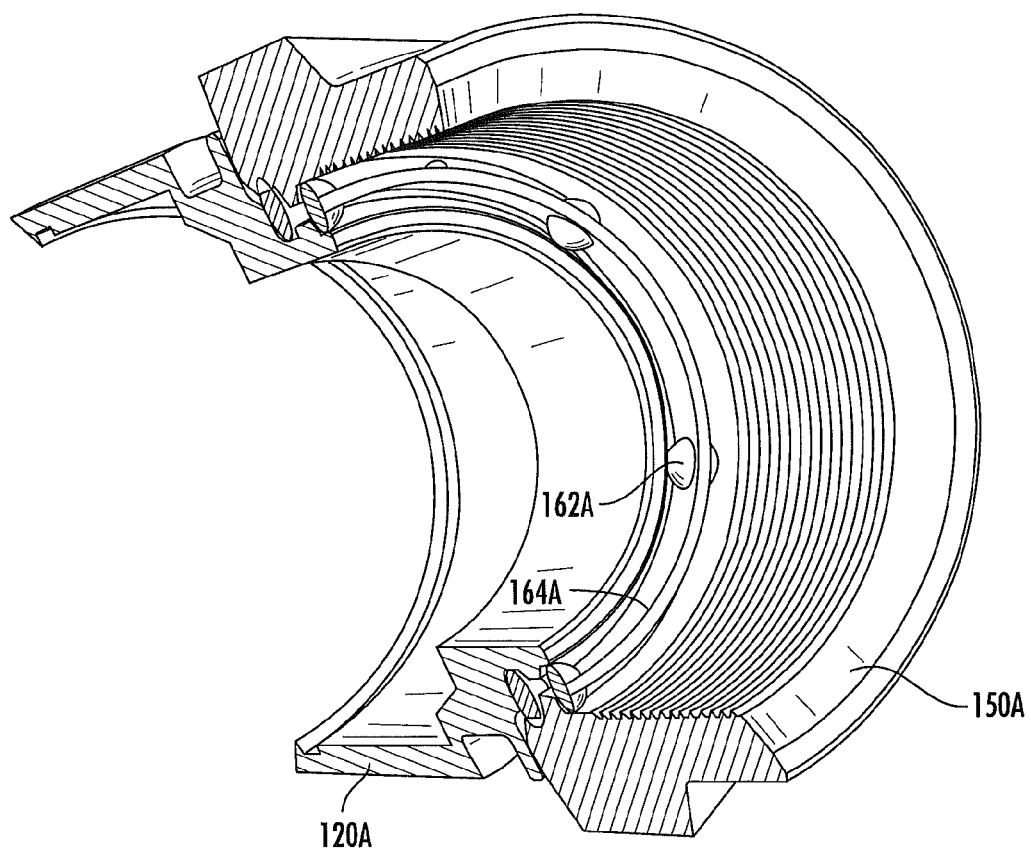
FIG. 13 is a perspective cut-away view of the internally threaded nut and a portion of the body assembly of the coaxial connector of FIG. 7.

FIGS. 7-13 illustrate a coaxial connector 100A according to embodiments of the present invention. In particular, FIG. 7 is a perspective view of the coaxial connector 100A. FIG. 8 is a cross-sectional view of the coaxial connector 100A with the compression sleeve thereof in its unseated position. FIG. 9 is a cross-sectional view of the coaxial connector 100A after it has received a coaxial cable 10, but before a compression sleeve of the coaxial connector 100A has been moved into its seated position to lock the coaxial cable 10 into place within coaxial connector 100A. FIG. 10 is an enlarged, partial perspective view of the body assembly and anti-friction bearing mechanism of the coaxial connector 100A. FIG. 11 is an enlarged, partial perspective view of the body assembly with a bearing retainer of the anti-friction bearing mechanism removed. FIG. 12 is a greatly enlarged, partial cross-sectional view of the coaxial connector 100A. Finally, FIG. 13 is a perspective cut-away view of the internally threaded nut and connector body of the coaxial connector 100A.

Referring to FIGS. 7-13, it can be seen that the male F-style coaxial connector 100A includes a body assembly 110A, a compression sleeve 140A and an internally-threaded rotatable nut 150A. The body assembly 110A comprises a tubular connector body 120A and a contact post 130A.

As shown in FIGS. 7-9, the connector body 120A may comprise a generally cylindrical body piece having an open interior. The connector body 120A may be formed of a conductive metal such as, for example, brass, steel or bronze or alloys thereof or another metal or metal alloy. In some embodiments, the connector body 120A may be formed of a non-conductive material such as plastic. The inner and/or outer diameters of the cylindrical body piece of the connector body 120A may vary along the length of the connector body 120A.

The internally-threaded nut 150A may comprise, for example, a brass or steel nut having an exterior surface that has a hexagonal transverse cross-section. The internally-threaded nut 150A may also include a front lip 152A that has a circular transverse cross-section. The internally-threaded nut 150A is mounted onto a front end of the body assembly 110A, and is mounted so that the internally-threaded nut 150A may freely rotate with respect to the body assembly 110A. The internally-threaded nut 150A includes a female connector port receiving cavity 154A that includes a plurality of threads 156A in a front portion thereof. The female connector port receiving cavity 154A receives the female connector port 40 when the coaxial connector 100A is threaded onto the female connector port 40. The internally-threaded nut 150A further includes an internal annular ridge 158A (see FIG. 8). An O-ring, gasket or other member 159A may be positioned between the internally-threaded nut 150A and the body assembly 110A to reduce or prevent water or moisture ingress into the interior of the F-style connector 100A.

As shown in FIGS. 8-9, the contact post 130A is mounted within both the connector body 120A and the internally-threaded nut 150A. The contact post 130A includes a base 132A that has a front face and a rear face and a post that extends from the rear face of the base 132A. The distal end of the post includes an opening that provides access to a cylindrical inner cavity of the contact post 130A. The contact post 130A may be used to connect the internally-threaded nut 150A to the connector body 120A, and may facilitate mounting the internally-threaded nut 150A to the connector body 120A so that the internally-threaded nut 150A may be freely rotated independent of the connector body 120A. The outside surface of the distal end of the contact post 130A may include one or more serrations, teeth, lips or other structures 138A. The contact post 130A is typically formed of a conductive material such as, for example, brass or steel.

The compression sleeve 140A may comprise a hollow cylindrical body having a front end and a rear end. The compression sleeve 140A is typically formed of a plastic material, but may also be formed of other materials. In some embodiments, the front end of the compression sleeve 140A may have a first external diameter that is less than a second external diameter of the rear end of the compression sleeve 140A. A gasket or O-ring 142A may be mounted on the exterior surface of the compression sleeve 140A. As shown in FIG. 8, the inner diameter of the front end of the compression sleeve 140A may be greater than the inner diameter of the rear end of the compression sleeve 140A. A ramped transition section may connect the inner radii of the front and rear ends of the compression sleeve 140A.

As shown in FIG. 9, the connector 100A may be used to terminate an end of a coaxial cable 10. Before the cable 10 is inserted into connector 100A, end portions of the dielectric 14, the tape 16, the electrical shield 18 and the cable jacket 20 are cut off and removed so that the end portion of the central conductor 12 is fully exposed. Additional end portions of the cable jacket 20 and any electrical shielding tape are then removed to expose the end portion of the wires of the electrical shield 18. The central conductor 12, dielectric 14, and the tape 16 of cable 10 are axially inserted through the compression sleeve 140A and into the internal cavity of the contact post 130A, while the electrical shield 18 and the cable jacket 20 are inserted through the compression sleeve 140A and over the outside surface of the contact post 140A. The exposed length of the central conductor 12 is sufficient such that it will pass all the way through the connector body 120A and extend into the internally-threaded nut 150A as the male contact protrusion of the connector 100A. The exposed end portions of the wires of the electrical shield 18 reside in a front portion of the generally annular cavity between the contact post 140A and the connector body 120A, thereby placing the electrical shield 18 in mechanical and electrical contact with at least one of the connector body 120A or the contact post 130A.

Figure 1:
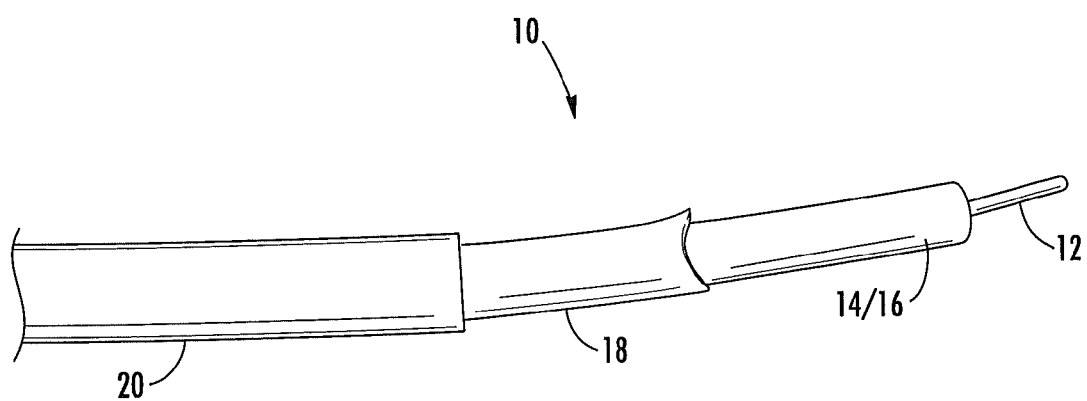
FIG. 1 is a perspective view of a conventional coaxial cable that has been partially cut apart.
Figure 2:
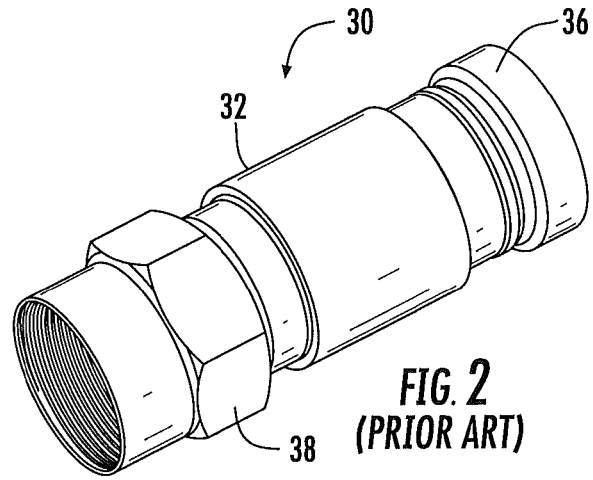
FIG. 2 is a perspective view of a conventional male F-style coaxial connector that has a compression style back fitting with the compression sleeve in an unseated position.
Figure 4:
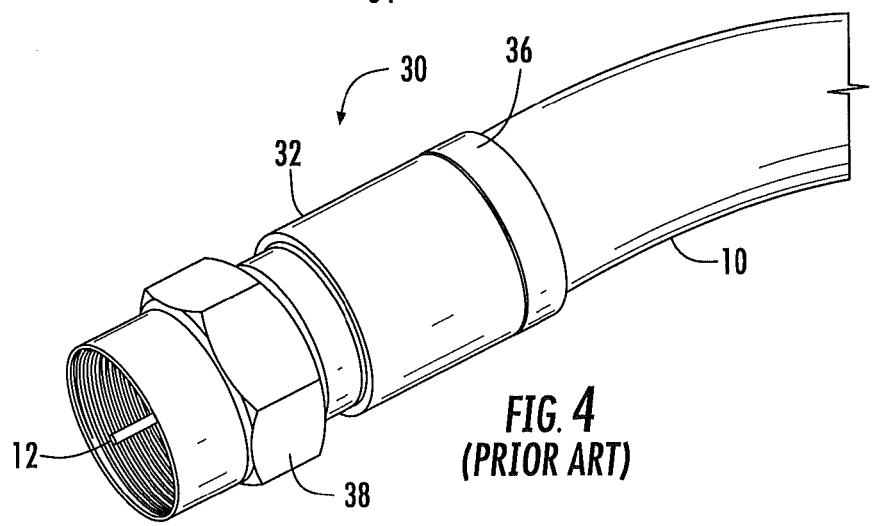
FIG. 4 is a perspective view of the conventional F-style coaxial connector of FIG. 2 mounted on a coaxial cable to provide a terminated coaxial cable.

As discussed above, proper operation of a conventional coaxial connector typically requires that a reliable electrical connection be established between the conductive housing pieces of the connector (e.g., the contact post, connector body and/or internally-threaded nut) and the conductive housing 41 of the female connector port 40. This electrical connection is used to carry the ground plane from the electrical shield 18 of the coaxial cable 10 to the conductive housing 41 of the female connector port 40 (i.e., as a ground plane conduction path). With a conventional male F-style coaxial connector such as connector 30 of FIGS. 2-4 above, this typically is accomplished by tightly threading and torquing to, for example, a predetermined minimum value the internally-threaded nut 38 onto the female connector port 40 so as to bring a front face of the base of the contact post 34 into firm mechanical and electrical contact with the distal face 44 of the housing 41 of female connector port 40. The internally-threaded nut 38 is also in direct contact with the housing 41 of female connector port 40, and thus may also provide a secondary ground plane conduction path. However, if the coaxial connector 30 starts to unthread from the female connector port 40 sufficiently such that the primary ground plane conduction path is lost and the portion of the secondary ground plane conduction path that passes through the connector body 32 to the nut 38 is degraded (as may happen when the nut 38 loosens), then the ground plane may be degraded and the received RF signal may be degraded or even lost.

As shown in FIGS. 8-13, the connector 100A further includes an anti-friction bearing mechanism 160A that is formed between the body assembly 110A and the internally-threaded nut 150A. An anti-friction bearing mechanism refers to a mechanism that includes one or more rolling and/or sliding elements that permit free motion between moving parts or between moving and fixed parts. Various anti-friction bearing mechanisms are known in the art, including, for example, roller bearing mechanisms and sliding plane bearing mechanisms. A roller bearing mechanism typically comprises one or more ball bearings, cylindrical bearings, disk bearings or other shaped rolling elements that are confined between a moving part and a fixed part or between two moving parts. Typically, the individual bearings are confined between inner and outer rings that are provided in these moving/fixed parts. A sliding plane bearing mechanism typically comprises one or more sliding elements that are confined between a moving part and a fixed part or between two moving parts.

As can be seen with reference to FIGS. 8-13, in the coaxial connector 100A the anti-friction bearing 160A is implemented as a roller bearing mechanism and, more particularly, as a ball bearing mechanism 160A. The ball bearing mechanism 160A includes a plurality of small, electrically conductive ball bearings 162A and a bearing retainer 164A. Herein, a "bearing retainer" (which may also be referred to as a "retainer") refers to structure that maintains roller bearings (e.g., ball bearings, cylindrical bearings, etc.) in a predetermined position, in a predetermined area and/or at a predetermined spacing. As shown best in FIGS. 8-9 and 12, the ball bearings 162A are captured between an outer surface of the body assembly 110A (i.e., connector body 120A and contact post 130A) and an inner surface of the internally-threaded nut 150A. The ball bearings 162A are positioned to be in firm mechanical contact with both the body assembly 110A and the internally-threaded nut 150A.

As shown in FIG. 12, in this particular embodiment, the ball bearings 162A are captured within an annular cavity 170A that is formed between the outer surface of the body assembly 110A and an inner surface of the internally-threaded nut 150A. As shown in FIGS. 10 and 12-13, the retainer 164A comprises an elongated planar substrate that includes a plurality of circular apertures 166A that is formed into an annular ring. The ball bearings 162A are circumferentially spaced apart within this annular cavity 170A, and the circular apertures 166A in the retainer 164A are used to hold each ball bearing 162A at a set distance from the other ball bearings 162A. In the depicted embodiment, both the tubular connector body 120A and the contact post 130A make contact with the ball bearings 162A (see FIG. 12). Each ball bearing 162A is designed to make mechanical and electrical contact with the tubular connector body 120A at a first point/area 174A and to make mechanical and electrical contact with the internally-threaded nut 150A at a second point/area 172A. Thus, if eight ball bearings 162A are provided, at least eight points of electrical contact are provided between the body assembly 110A and the ball bearings 162A and another eight points of contact are provided between the internally-threaded nut 150A and the ball bearing 162A.

Rolling resistance is generally much less than sliding resistance. As such, when the ball bearings 162A are positioned between the body assembly 110A and the internally-threaded nut 150A, the internally-threaded nut 150A may be mounted so that it freely rotates with respect to the body assembly 110A even though both the body assembly 110A and the internally-threaded nut 150A are placed in firm mechanical contact with the ball bearings 162A. Thus, the ball bearings 162A may be configured to be in firm mechanical and good electrical contact with both the body assembly 110A and the internally-threaded nut 150A at all times, including when the internally-threaded nut 150A has loosened to a degree from a mating female connector port 40. In the embodiment of FIGS. 7-13, a total of eight ball bearings 162A are provided. It will be appreciated, however, that different numbers of ball bearings (e.g., 3, 4, 6, 10, or other numbers) could alternatively be used.

Figure 14:
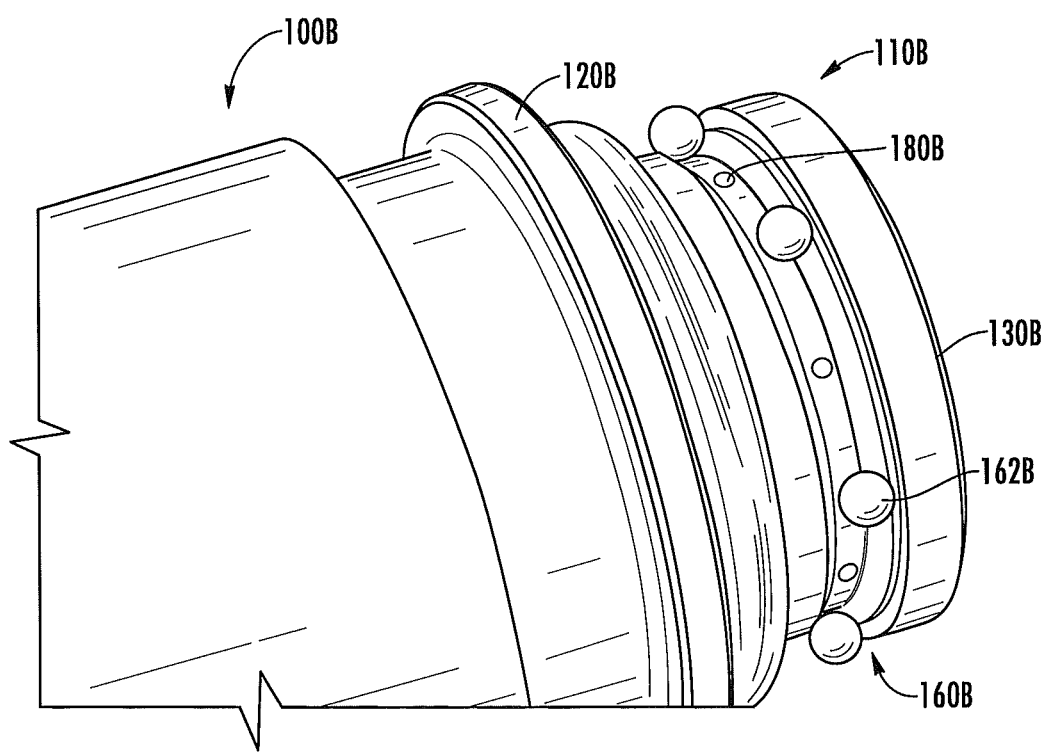
FIG. 14 is an enlarged, partial perspective view of the body assembly of a coaxial connector according to further embodiments of the present invention that includes an alternative anti-friction bearing mechanism.
Figure 15:
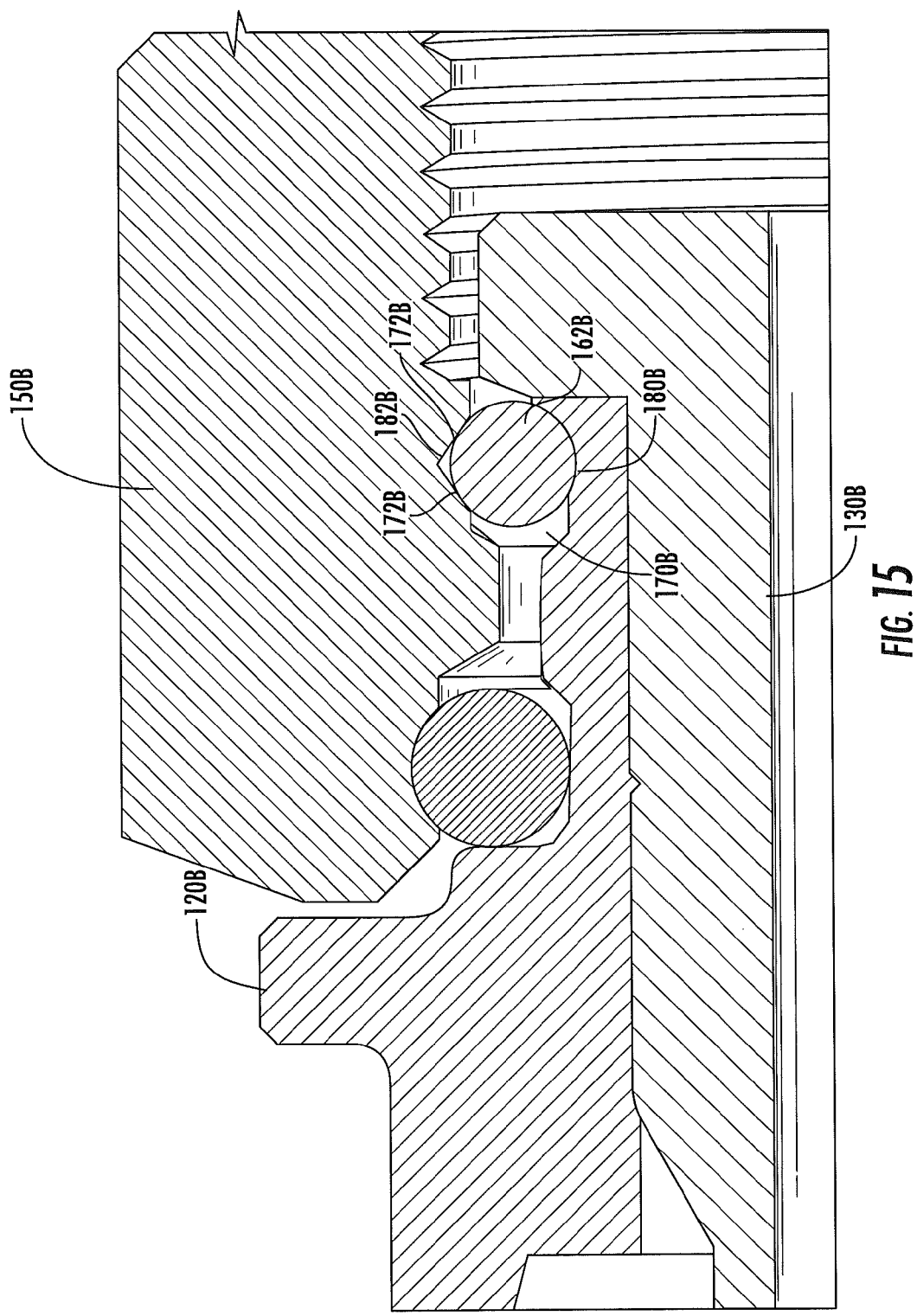
FIG. 15 is a greatly enlarged, partial cross-sectional view of the coaxial connector of FIG. 14.

FIGS. 14 and 15 together illustrate portions of a coaxial connector 100B according to further embodiments of the present invention. The coaxial connector 100B may be identical to the coaxial connector 100A that is described above with respect to FIGS. 7-13 except that the coaxial connector 100B includes an anti-friction bearing mechanism 160B in place of the anti-friction bearing mechanism 160A that is described above, and includes a body assembly 110B and an internally-threaded nut 150B that are configured to accommodate the anti-friction bearing mechanism 160B. Accordingly, the description of the coaxial connector 100B below will focus solely on these elements. The coaxial connector 100B may provide an enhanced electrical connection as compared to the coaxial connector 100A.

As shown in FIGS. 14 and 15, the anti-friction bearing mechanism 160B includes a plurality of ball bearings 162B that may be identical to the ball bearings 162A, but does not include the retainer 164A that is included in the anti-friction bearing mechanism 160A. In the coaxial connector 100B, a plurality of detents 180B are provided in the outer surface of the connector body 120B of body assembly 110B. The ball bearings 162B may be mounted in respective ones of the detents 180B, and the detents 180B may be spaced so as to maintain the ball bearings 162B at a desired (e.g., uniform) separation from each other. Thus, each detent 180B acts as a ball bearing cavity. In the depicted embodiment, each detent 180B is a partially spherical detent 180B in the outer surface of the connector body 120B. The diameter of each partially spherical detent 180B may be slightly larger than the diameter of the ball bearings 162B. The depth of each detent 180B may, for example, be between approximately one-sixteenth to approximately one-half the diameter of the ball bearings 162B. Each detent 180B thus captures its respective ball bearing 162B and holds it in position. The detents 180B maintain the ball bearings 162B at a uniform spacing from each other around the annular channel 170B defined between the exterior surface of the body assembly 110B and the inner surface of the internally-threaded nut 150B. As is shown in FIG. 15, an annular groove 182B may be provided in the inner surface of the nut 150B. This annular groove 182B may have, for example, a v-shaped cross-section as illustrated in FIG. 15 or a cross-section that defines part of a circle (not shown in the figures), with the diameter of the circle being slightly larger than the diameter of the ball bearings 162B.

The inclusion of grooves, detents, depressions or the like in one or both of an outer surface of the body assembly 110B or the inner surface of the internally-threaded nut 150B may increase the number of points of contact between the ball bearings 162B and the body assembly 110B and/or the internally-threaded nut 150B. By way of example, as shown in FIG. 15, the ball bearing 162B may make mechanical and electrical contact with the internally-threaded nut 150B at two points 172B, thereby potentially doubling the number of points of electrical contact as compared to coaxial connector 100A. Likewise, each ball bearing 162B may have multiple points of contact 174B within its respective detent 180B in the tubular connector body 120B.

Figure 16:
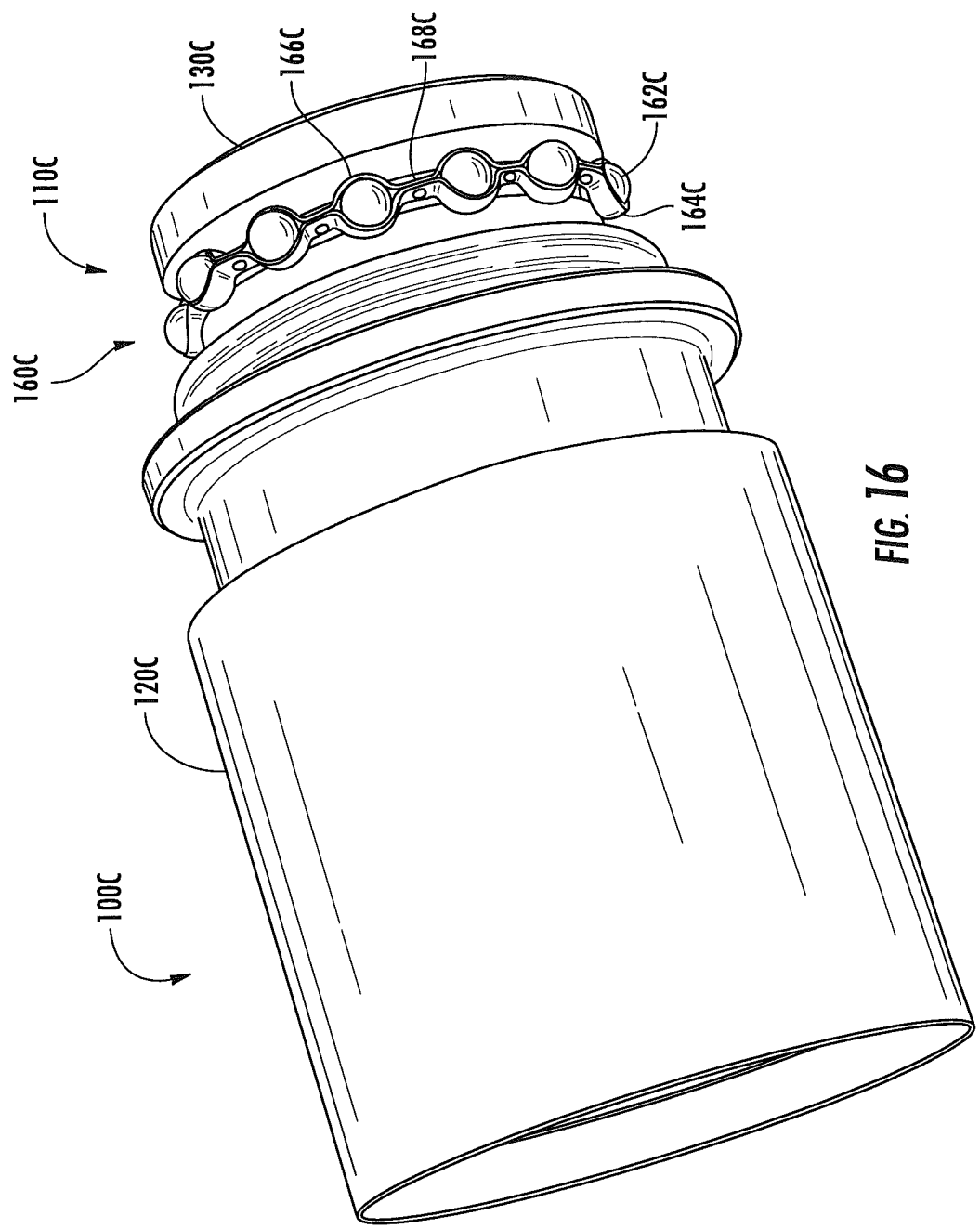
FIG. 16 is an enlarged perspective view of the body assembly of a coaxial connector according to further embodiments of the present invention that includes an alternative anti-friction bearing mechanism.

FIG. 16 is a perspective view of a body assembly 110C and an anti-friction bearing mechanism 160C of a coaxial connector 100C according to further embodiments of the present invention. The coaxial connector 100C may be identical to the coaxial connector 100A that is described above with respect to FIGS. 7-13 except that the coaxial connector 100C includes the anti-friction bearing mechanism 160C instead of the anti-friction bearing mechanism 160A. Accordingly, the description of the coaxial connector 100C below will focus solely on the anti-friction bearing mechanism 160C.

As shown in FIG. 16, the anti-friction bearing mechanism 160C includes a plurality of ball bearings 162C that may be identical to the ball bearings 162A, and a retainer 164C. The retainer 164C includes a plurality of apertures 166C. A ball bearing 162C is positioned within each aperture 166C. Spacing segments 168C are provided between each aperture 166C so that the retainer 164C comprises an annular race. The retainer 164C maintains a desired spacing between each of the ball bearings 162C while allowing the ball bearings 162C to freely rotate. While each aperture 166C in the retainer 164C of FIG. 16 is sized to be just large enough to hold one of the ball bearings 162C, it will be appreciated that, in other embodiments, larger apertures may be used such as oblong apertures that are significantly larger than the ball bearings 162C. While not shown in FIG. 16, it will be appreciated that grooves, detents, depressions or the like may be included in one or both of an outer surface of the body assembly 110C of the coaxial connector 100C or in the inner surface of the internally-threaded nut (not shown) of the coaxial connector 100C in order to, for example, increase the number of points of contact between the ball bearings 162C and the body assembly 110C and/or the nut of coaxial connector 100C.

Figure 17:
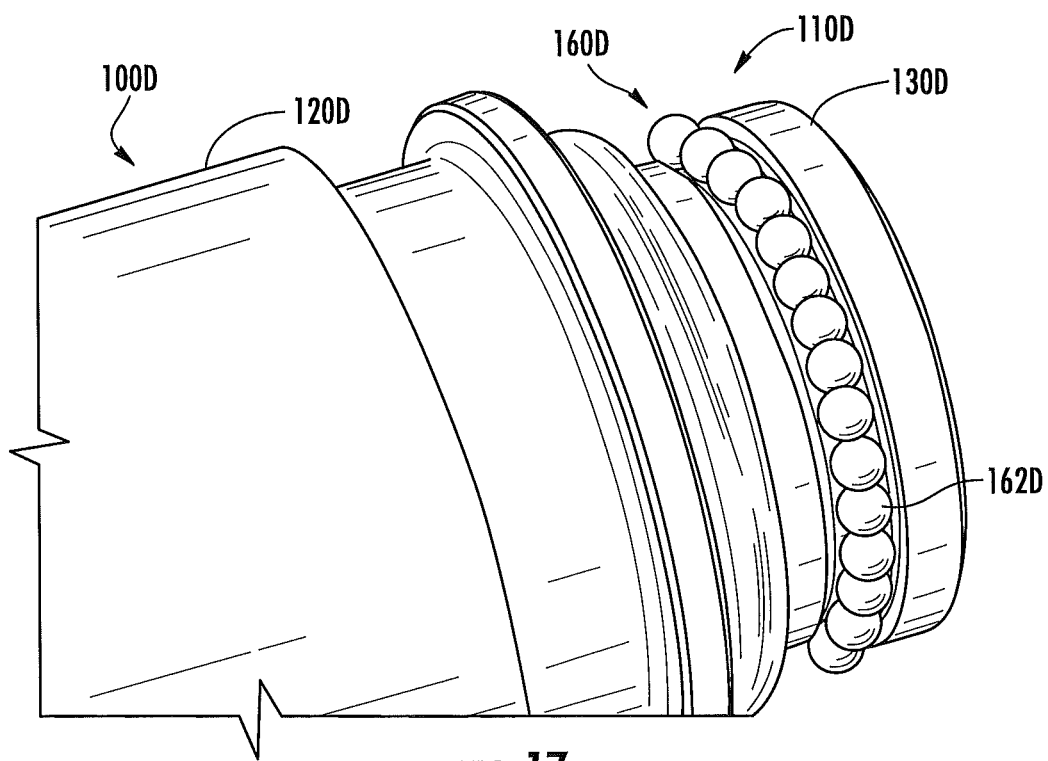
FIG. 17 is an enlarged, partial perspective view of the body assembly of a coaxial connector according to further embodiments of the present invention that includes another alternative anti-friction bearing mechanism.

FIG. 17 is a perspective view of a body assembly 110D and an anti-friction bearing mechanism 160D of a coaxial connector 100D according to further embodiments of the present invention. The coaxial connector 100D may be identical to the coaxial connector 100A that is described above with respect to FIGS. 7-13 except that the coaxial connector 100D includes the anti-friction bearing mechanism 160D instead of the anti-friction bearing mechanism 160A. Accordingly, the description of the coaxial connector 100D below will focus solely on the anti-friction bearing mechanism 160D.

As shown in FIG. 17, the anti-friction bearing mechanism 160D comprises a larger number of ball bearings 162D. As shown in FIG. 17, the ball bearings 162D may substantially fill the annular cavity 170D (not shown, but may be identical to the annular cavity 170A discussed above) that is defined between the body assembly and nut of the coaxial connector. As a result, any need for a retainer or other retention mechanism (e.g., detents) may be removed.

Pursuant to further embodiments of the present invention, coaxial connectors are provided that include anti-friction bearing mechanisms that use bearings other than ball bearings. For example, FIGS. 18-20 illustrate coaxial connectors 100E-100G, respectively, that have anti-friction bearing mechanisms that use cylindrical bearings that are similar to the coaxial connectors 100A-100C described above.

Figure 18:
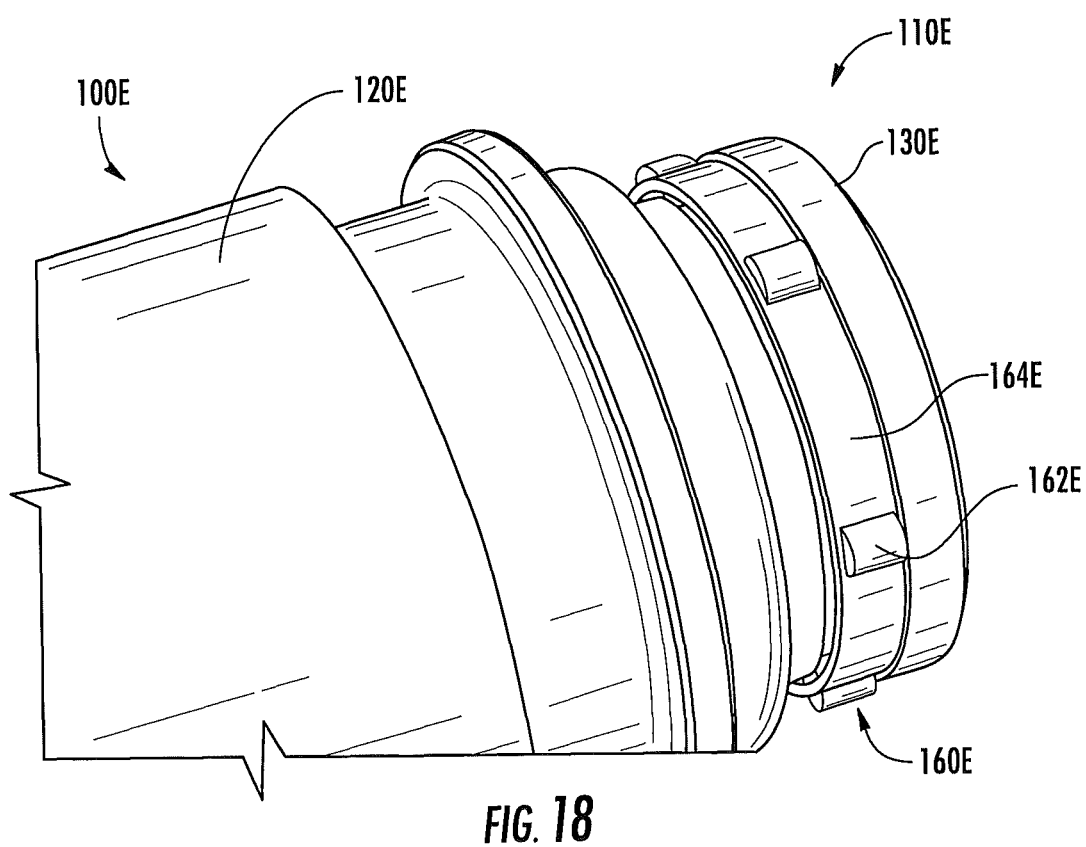
FIG. 18 is an enlarged, partial perspective view of the body assembly of a coaxial connector according to further embodiments of the present invention that includes yet another alternative anti-friction bearing mechanism.

FIG. 18 is a perspective view of a body assembly 110E and an anti-friction bearing mechanism 160E of a coaxial connector 100E according to further embodiments of the present invention. The coaxial connector 100E may be identical to the coaxial connector 100A that is described above with respect to FIGS. 7-13 except that the coaxial connector 100E includes the anti-friction bearing mechanism 160E instead of the anti-friction bearing mechanism 160A. Accordingly, the description of the coaxial connector 100E below will focus solely on the anti-friction bearing mechanism 160E.

As shown in FIG. 18, the anti-friction bearing mechanism 160E includes roller bearings 162E that are cylindrical bearings instead of the ball bearings 162A of anti-friction bearing mechanism 160A. The anti-friction bearing mechanism 160E further includes a retainer 164E which comprises an elongated planar substrate that includes a plurality of rectangular apertures that are sized to receive respective ones of the cylindrical bearings 162E. This planar substrate is formed into an annular ring to form the retainer 164E. The retainer 164E acts to space the cylindrical bearings 162E apart circumferentially within the annular cavity formed between the body assembly and the internally-threaded nut of coaxial connector 100E.

Figure 19:
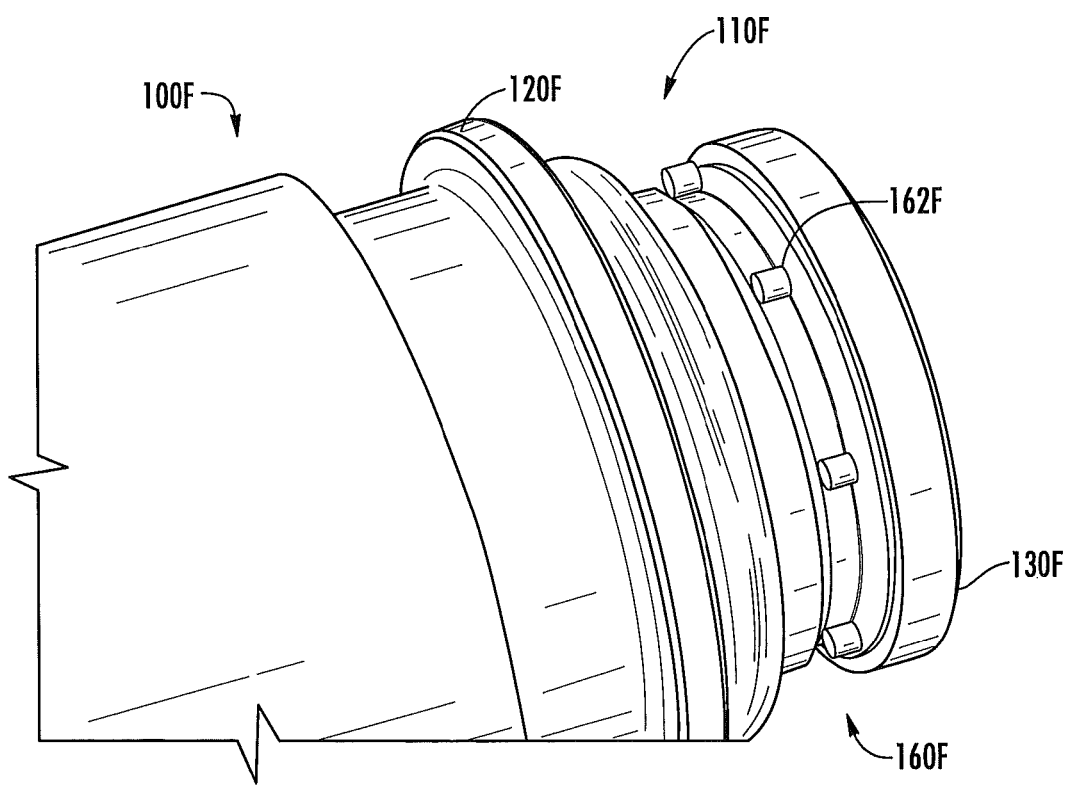
FIG. 19 is an enlarged, partial perspective view of the body assembly of a coaxial connector according to further embodiments of the present invention that includes an alternative anti-friction bearing mechanism that uses cylindrical bearings.
Figure 20:
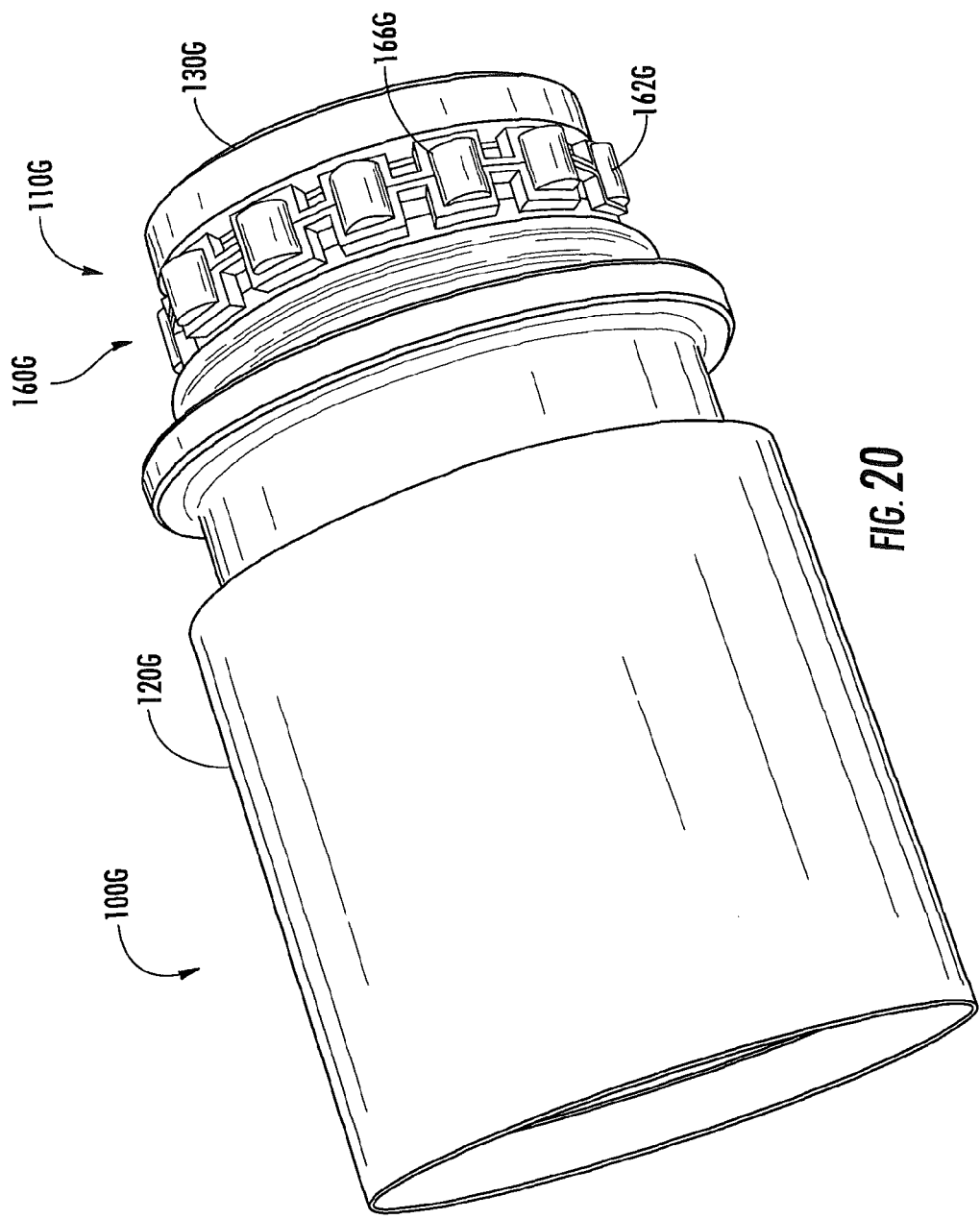
FIG. 20 is an enlarged perspective view of the body assembly of a coaxial connector according to further embodiments of the present invention that includes another alternative anti-friction bearing mechanism that uses cylindrical bearings.

FIG. 19 is a perspective view of a body assembly 110F and an anti-friction bearing mechanism 160F of a coaxial connector 100F according to further embodiments of the present invention. The coaxial connector 100F may be identical to the coaxial connector 100B that is described above with respect to FIGS. 14-15 except that the anti-friction bearing mechanism 160F depicted in FIG. 19 uses cylindrical bearings 162F as opposed to the ball bearings 162B used in the anti-friction bearing mechanism 160B that is described above. As connectors 100B and 100F will operate in the same manner, further description of the coaxial connector 100F will be omitted.

FIG. 20 is a perspective view of a body assembly 110G and an anti-friction bearing mechanism 160G of a coaxial connector 100G according to further embodiments of the present invention. The coaxial connector 100G may be identical to the coaxial connector 100C that is described above with respect to FIG. 16 except that the anti-friction bearing mechanism 160G depicted in FIG. 20 uses cylindrical bearings 162G as opposed to the ball bearings 162C used in the anti-friction bearing mechanism 160C that is described above. The retainer 164G included in the anti-friction bearing mechanism 160G has rectangular apertures 166G. As connectors 100C and 100G will operate in the same manner, further description of the coaxial connector 100G will be omitted.

While not shown in the drawings, it will be appreciated that in further embodiments the coaxial connector 100D of FIG. 17 may be modified to include cylindrical roller bearings instead of ball bearings.

While the above depicted embodiments of the present invention each use either ball bearings or cylindrical bearings, it will be appreciated that, according to further embodiments of the present invention, other types of roller bearings could be used. By way of example, tapered bearings, egg-shaped bearings or any other types of roller bearing could be used, in the anti-friction bearing mechanisms according to embodiments of the present invention, and any associated retainer or retention mechanism (e.g., channels, detents or other depressions or the like) may be appropriately modified to receive these different types of roller bearings. Thus, it will be appreciated that the present invention is not limited to ball bearings and cylindrical bearings.

Figure 21:
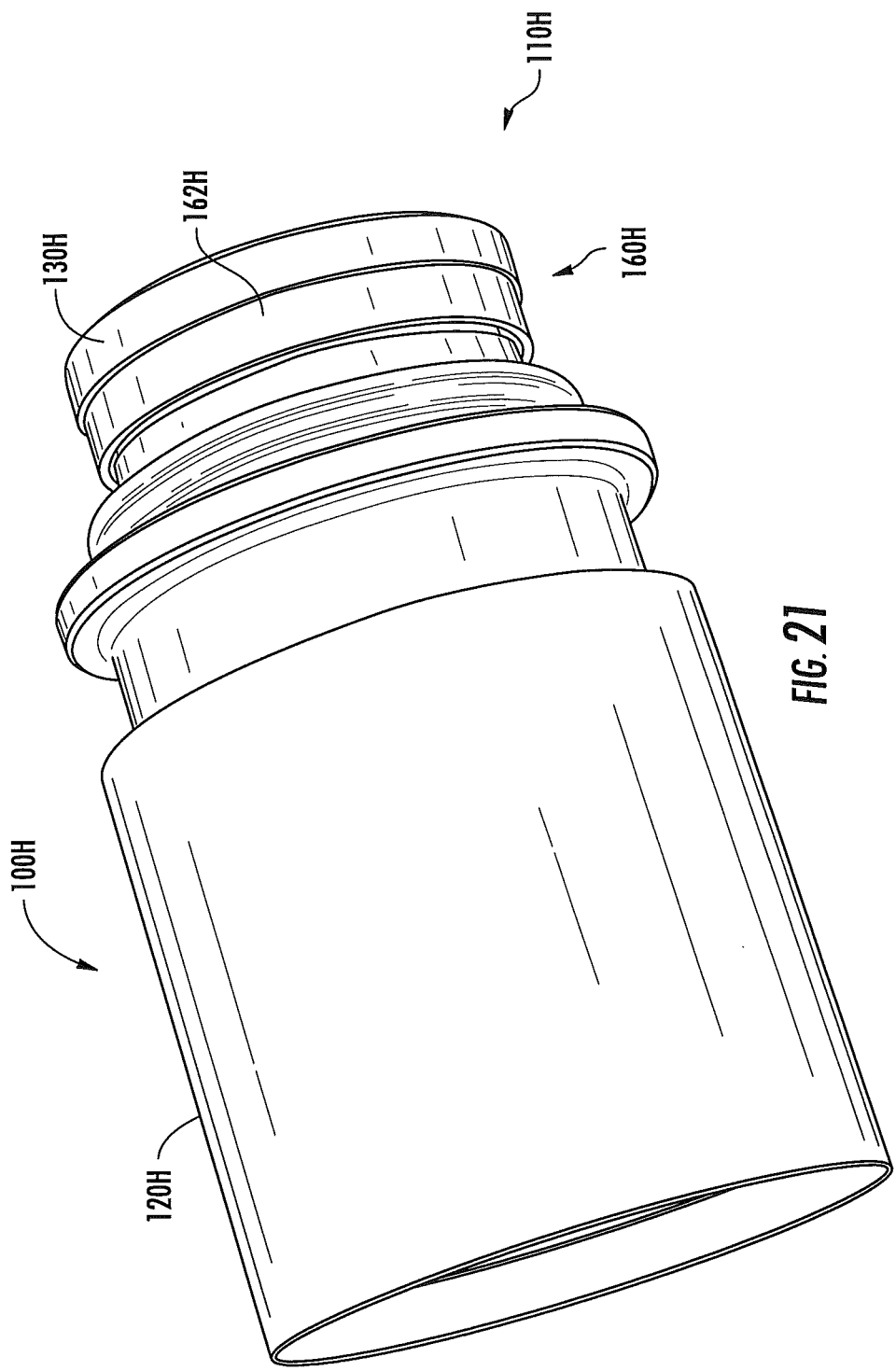
FIG. 21 is a perspective view of the body assembly of a coaxial connector that includes a sliding plane anti-friction bearing mechanism.
Figure 22:
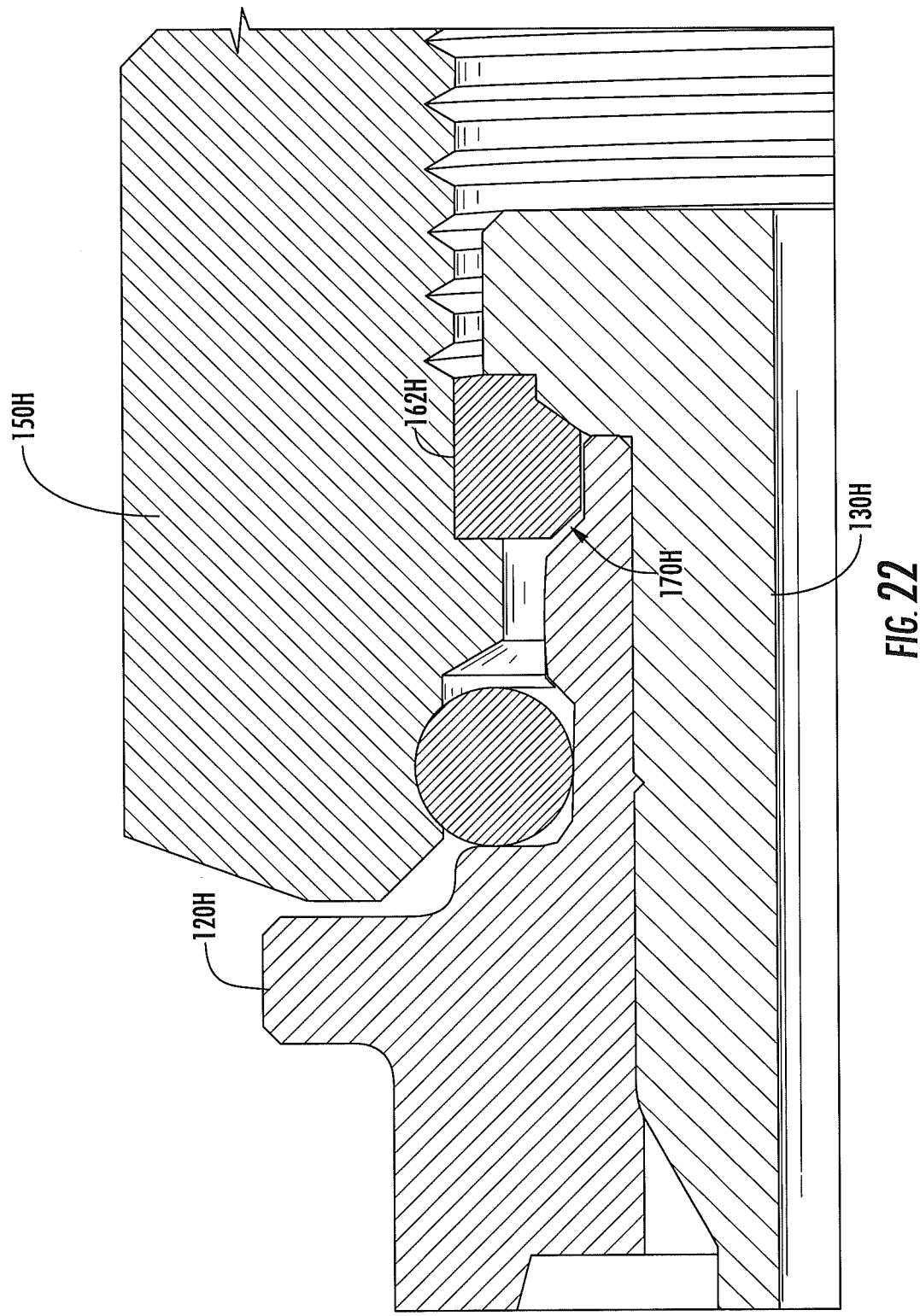
FIG. 22 is a greatly enlarged, partial cross-sectional view of the coaxial connector of FIG. 21.

Pursuant to still further embodiments of the present invention, coaxial connectors are provided that include anti-friction bearing mechanisms that use sliding bearings instead of roller bearings. FIGS. 21 and 22 illustrate portions of a coaxial connector 100H that includes an anti-friction bearing mechanism 160H that uses a sliding bearing 162H. The coaxial connector 100H may be substantially identical to the coaxial connector 100A of FIGS. 7-13 with the exception of the differences shown in FIGS. 21 and 22 that are discussed below.

As shown in FIG. 21, the sliding bearing 162H comprises an annular element that is disposed in the annular cavity 170H that is formed between the exterior surface of the body assembly 110H and the interior surface of the internally-threaded nut 150H. The annular sliding bearing 162H may comprise an element that has a lower static and/or dynamic coefficient of friction than brass, steel or the like. In some embodiments, the annular sliding bearing 162H may be formed of oil-impregnated bronze or oil-impregnated brass or similar materials. The annular sliding bearing 162H may fit rather tightly in the annular cavity so that it maintains continuous mechanical and electrical contact with both the body assembly 110H and the internally-threaded nut 150H. The use of a sliding bearing 162H that has a lower coefficient of friction allows the bearing to more firmly contact both the body assembly 110H and the internally-threaded nut 150H while still allowing the internally-threaded nut 150H to rotate freely with respect to the body assembly 110H.

The coaxial connectors according to embodiments of the present invention may provide an improved secondary ground plane conduction path. This secondary ground plane conduction path extends from the electrical shield 18 of the coaxial cable 10 that is terminated into the coaxial connector, to the body assembly of the connector, to the anti-friction bearing mechanism, to the internally-threaded nut, and to the housing 41 of the female connector port 40. As discussed above, the anti-friction bearing mechanism may improve the electrical connection between the body assembly and the internally-threaded nut, particularly when the nut is not fully tightened onto the female connector port 40.

According to some embodiments of the present invention, the roller or slider bearings may be formed of a metal that is similar or identical to the metals used to form part or all of the body assembly and/or the internally-threaded nut. In some embodiments, at least part of the body assembly and the nut may be formed of brass, and the roller/slider bearings may comprise brass or bronze bearings (or at least brass-plated or bronze-plated bearings).

The use of similar or identical metals may reduce or minimize the degradation of one or more of the body assembly, the roller/slider bearings and/or the internally-threaded nut when these elements are exposed to various electrolytes such as water, fog, humid air and the like. Additionally, the use of similar or identical metals may also reduce the possibility that a film (which may exhibit insulative or semiconductor properties) builds up between the metals in the presence of an RF source and an electrolyte. However, it will be appreciated that other materials may be used to form the roller/slider bearings. By way of example, in some embodiments steel ball bearings or ball bearings with electrically conductive platings may be used regardless of the materials that are used to form the connector body, contact post and/or the internally-threaded nut of the coaxial connector.

Figure 23:
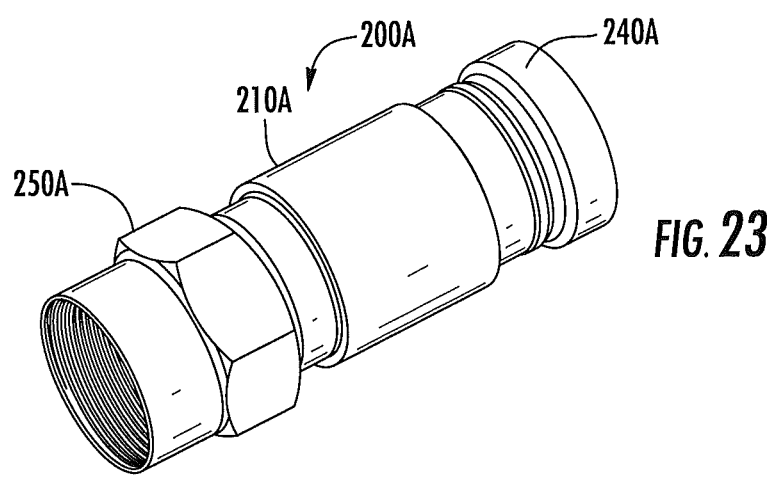
FIG. 23 is a perspective view of a coaxial connector according to still further embodiments of the present invention that includes a locking mechanism.
Figure 24:
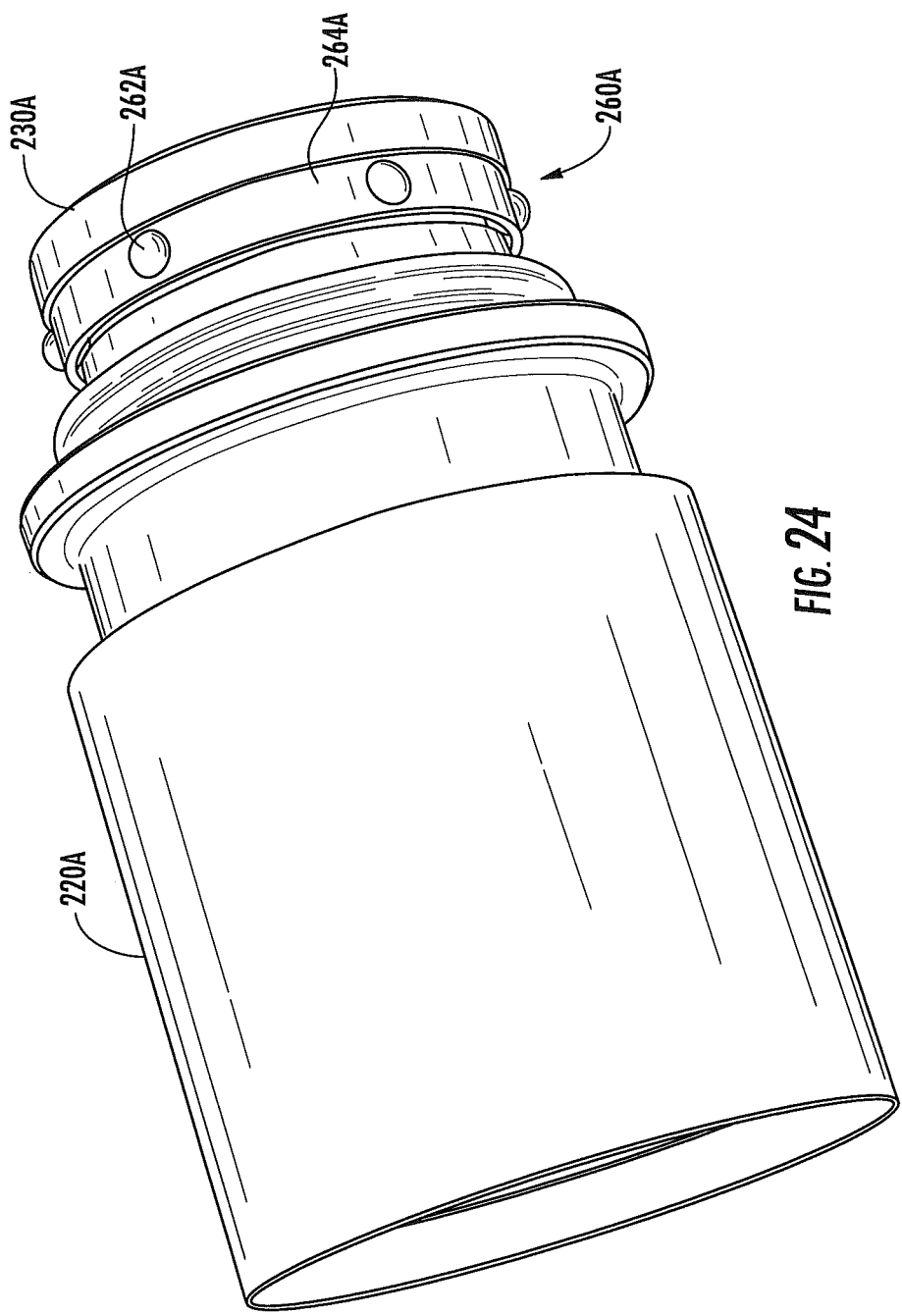
FIG. 24 is an enlarged perspective view of the body assembly of the coaxial connector of FIG. 23 that illustrates an anti-friction bearing mechanism thereof.
Figure 25:
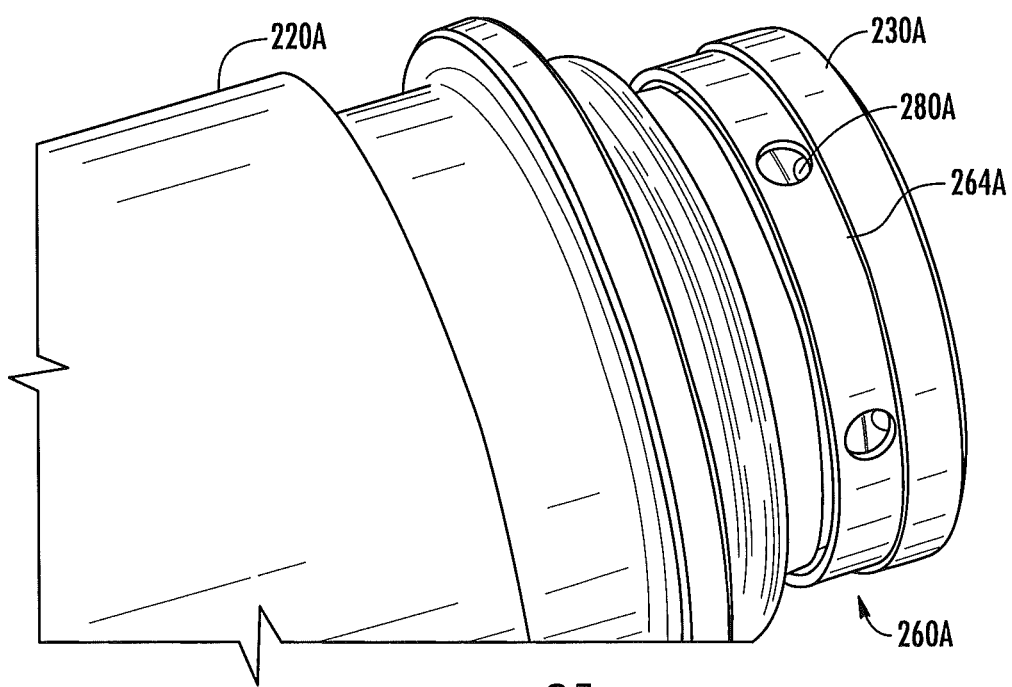
FIG. 25 is an enlarged, partial perspective view of the body assembly of the coaxial connector of FIG. 23 with the ball bearings of an anti-friction bearing mechanism removed.
Figure 26:
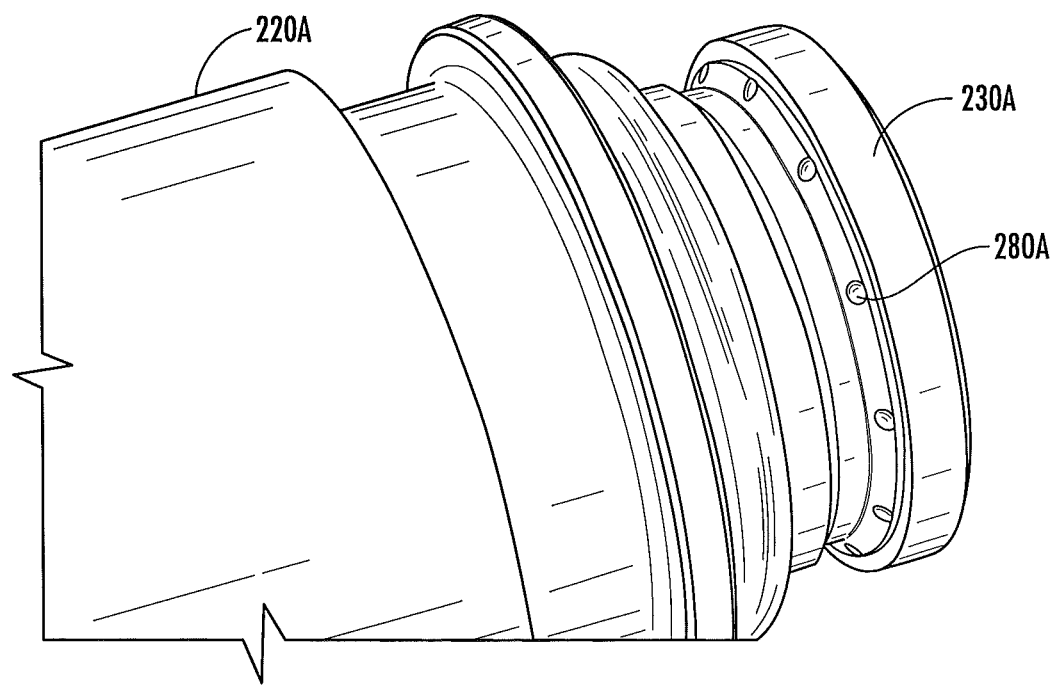
FIG. 26 is an enlarged, partial perspective view of the body assembly of the coaxial connector of FIG. 23 with the ball bearings and the bearing retainer of the anti-friction bearing mechanism removed.
Figure 27:
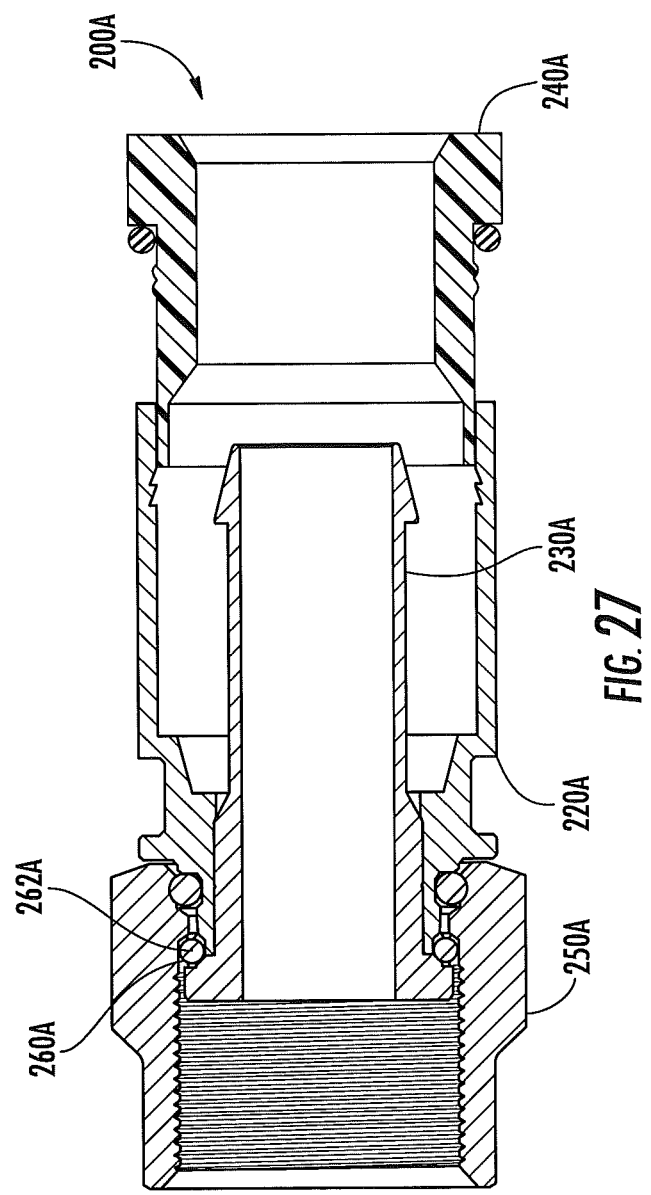
FIG. 27 is a cross-sectional view of the coaxial connector of FIG. 23.
Figure 28:
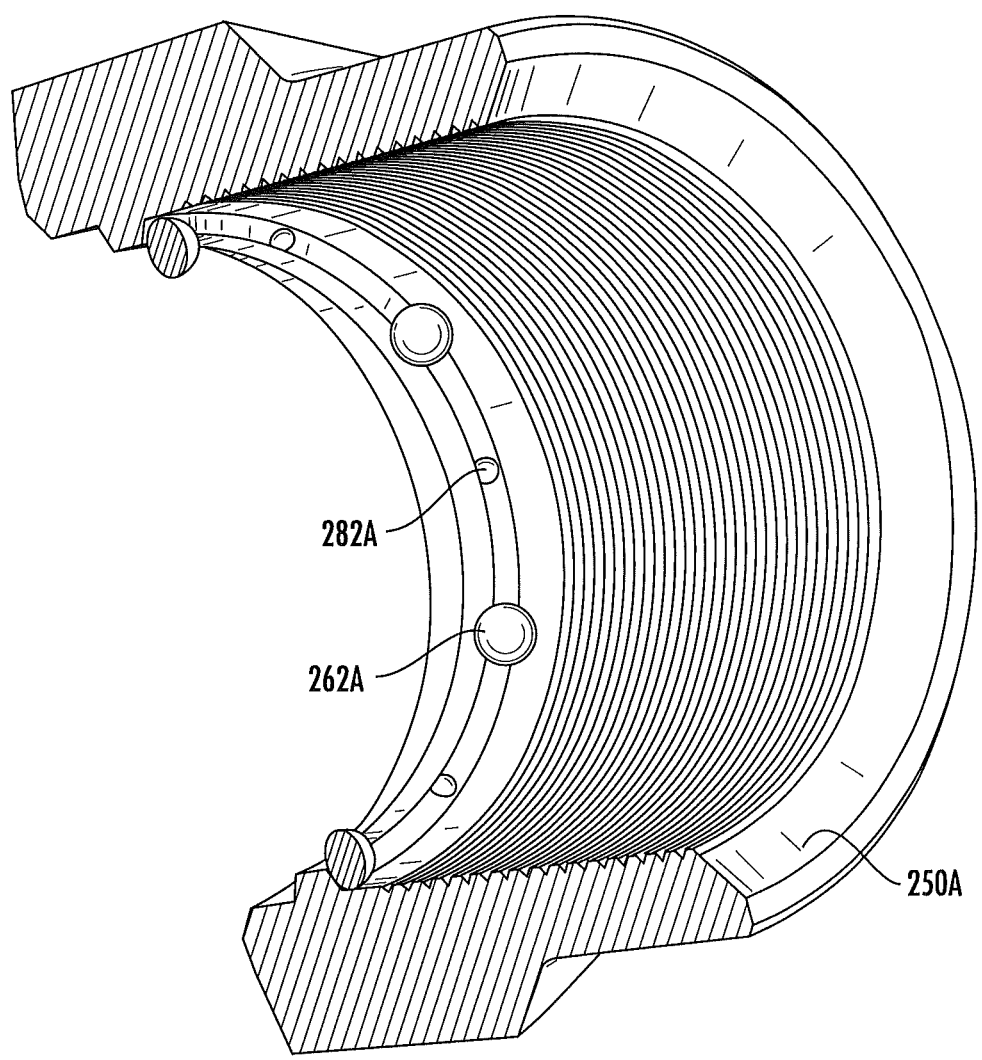
FIG. 28 is a perspective cut-away view of the internally threaded nut of the coaxial connector of FIG. 23.
Figure 29:
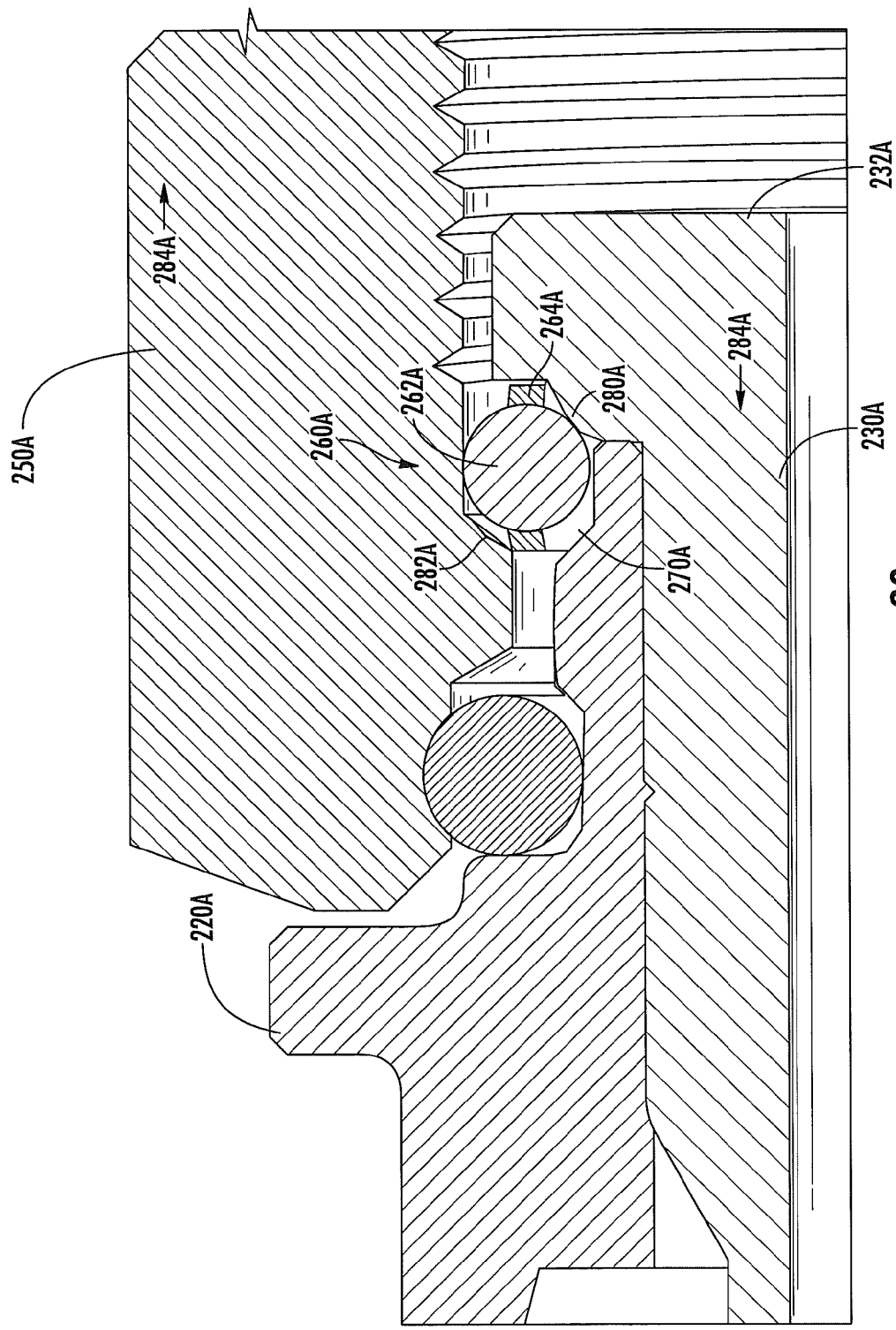
FIG. 29 is a greatly enlarged, partial cross-sectional view of the coaxial connector of FIG. 23.

Pursuant to still further embodiments of the present invention, coaxial connectors are provided that include both an anti-friction bearing mechanism and an anti-rotation or "locking" feature. FIGS. 23-29 depict one such coaxial connector 200A. In particular, FIG. 23 is a perspective view of the coaxial connector 200A. FIG. 24 is an enlarged perspective view of the body assembly and anti-friction bearing of the coaxial connector 200A. FIG. 25 is an enlarged, partial perspective view of the body assembly of the coaxial connector 200A with the ball bearings of an anti-friction bearing mechanism removed. FIG. 26 is an enlarged, partial perspective view of the body assembly of the coaxial connector 200A with the anti-friction bearing mechanism removed. FIG. 27 is a cross-sectional view of the coaxial connector 200A. FIG. 28 is a perspective cut-away view of the internally-threaded nut of the coaxial connector 200A. FIG. 29 is a greatly enlarged, partial cross-sectional view of the coaxial connector 200A.

As shown in FIGS. 23-29, the coaxial connector 200A includes a body assembly 210A, a compression sleeve 240A and an internally-threaded rotatable nut 250A. The body assembly 210A includes a tubular connector body 220A and a contact post 230A (see FIG. 27). The compression sleeve 240A may comprise any conventional design, and hence will not discussed further. The connector body 220A may be identical to the connector body 120A discussed above with respect to FIGS. 7-13. The contact post 230A and the internally-threaded nut 250A may be identical to the contact post 130A and the internally-threaded nut 150A discussed above with respect to FIGS. 7-13 except that these components may include recesses therein that act as a locking mechanism, as is described in detail below. The coaxial connector 200A further includes an anti-friction bearing mechanism 260A. The anti-friction bearing mechanism 260A comprises a plurality of ball bearings 262A and a retainer 264A. The anti-friction bearing mechanism 260A may be identical to the anti-friction bearing mechanism 160A that is described above with respect to the coaxial connector 100A of FIGS. 7-13.

As shown in FIGS. 25-26 and 29, the contact post 230A includes a plurality of recesses 280A on an posterior surface thereof. These recesses 280A act as a locking mechanism that resists unthreading of the internally-threaded nut 250A once the internally-threaded nut 250A has been tightened onto a mating female connector port 40, as will be described below. Likewise, as shown in FIG. 28, the internally-threaded nut 250A includes a plurality of recesses 282A on an interior surface thereof, which also act as a locking mechanism that resists unthreading of the internally-threaded nut 250A once the internally-threaded nut 250A has been tightened onto a mating female connector port 40.

The locking mechanism operates as follows. Referring to FIG. 29, as the internally-threaded nut 250A is tightened onto a mating female connector port 40, the ball bearings 262A will tend to move within the annular cavity 270A in which the anti-friction bearing mechanism 260A is disposed. Once the distal end 44 of the female connector port 40 (not shown in FIG. 29) comes into contact with the base 232A of the contact post 230A, further tightening of the internally-threaded nut 250A causes the contact post 230A and the internally-threaded nut 250A to move with respect to each other in the directions shown by the arrows labeled 284A in FIG. 29. When this occurs, the interior face of the nut 250A that includes the recesses 282A comes into contact with the ball bearings 262A, as does the exterior face of the contact post 230A that includes the recesses 280A.

The recesses 282A that are provided in the interior face of the internally-threaded nut 250A and the recesses 280A that are provided in the exterior face of the contact post 230A may each comprise a partially spherical detent. As the internally-threaded nut 250A is further tightened onto the female connector port 40, the ball bearings 262A "find" the detents 280A, 282A as the ball bearings 262A move within the annular cavity, and tend to lodge within these detents 280A, 282A (which are spaced apart at the same spacing as the apertures in the retainer 264A), as the lodging of the ball bearings 262A within the detents 280A, 282A allows further tightening of the internally-threaded nut 250A onto the female connector port 40. Once the ball bearings 262A are lodged within the detents 280A, 282A, extra force is required to rotate the internally-threaded nut 250A to drive the ball bearings 262A back out of the detents 280A, 282A (in either direction). Thus, the detents 280A, 282A comprise an anti-rotation element that act to lock the internally-threaded nut 250A in place once the internally-threaded nut 250A is tightened onto a female connector port 40. In effect, the detents 280A, 282A and ball bearings 262A work together in a manner similar to a locking nut. Additionally, this design may increase the number of contact points between the ball bearings 262A and the body assembly 210A and the nut 250A, thereby potentially providing an improved electrical connection for the ground plane conduction path as well.

Figure 30:
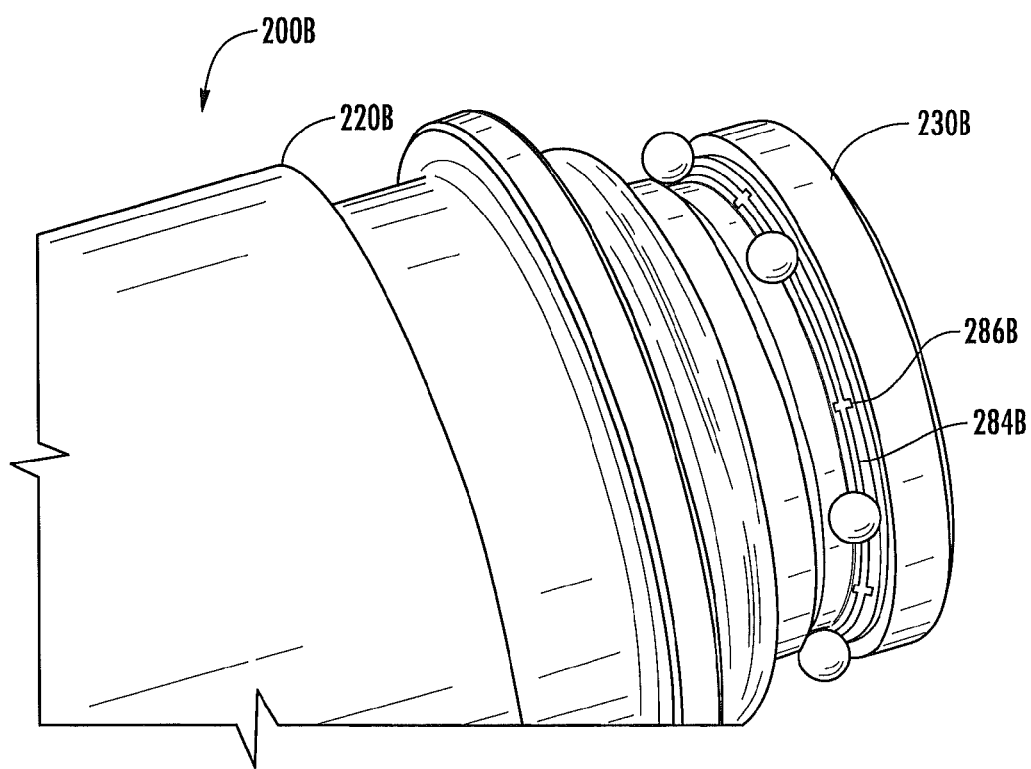
FIG. 30 is a partial perspective view of an alternative locking mechanism that is used in coaxial connectors according to still further embodiments of the present invention.

FIG. 30 illustrates the body assembly 210B of a coaxial connector 200B according to further embodiments of the present invention. The coaxial connector 200B may be identical to the coaxial connector 200A that is described above with respect to FIGS. 23-29, except that the coaxial connector 200B includes a different locking mechanism.

In particular, as shown in FIG. 30, the detents 280A included on the exterior surface of the contact post 230A of coaxial connector 200A are replaced in the coaxial connector 200B with a milled channel 284B and milled slots or pockets 286B. While not shown in the figures, a similar channel and milled slots or pockets may alternatively and/or additionally be included in place of the detents 282A that are provided on the interior surface of the internally threaded nut (not shown) of coaxial connector 200B. As this nut is tightened onto a female connector port 40, the ball bearings 262B "find" the milled slots or pockets 286B in the same manner that the ball bearings 262A "find" the detents 280A, 282A that are included in the contact post 230A and internally-threaded nut 250A of coaxial connector 200A. In the depicted embodiment, the milled slots 286B run generally normal to the milled channel 284B (i.e., the slots 286B run generally in the axial/longitudinal direction).

It will be appreciated that the roller bearings according to embodiments of the present invention may be used in any of a wide variety of conventional or non-conventional F-style coaxial connectors to provide improved ground plane conduction paths. Thus, the specific design for the coaxial connectors (e.g., the designs for the connector bodies, compression sleeves, contact posts and internally-threaded nuts of those connectors) discussed above are not intended to be limiting, but are simply provided so that the present specification will provide a clear description as to how the anti-friction bearing mechanisms according to embodiments of the present invention may be used to improve the electrical performance of a coaxial connector. Thus, for example, it will be appreciated that the anti-friction bearing mechanisms according to embodiments of the present invention may be used on F-style coaxial connectors that have a compression sleeve that fits over the outside surface of the connector body and/or on F-style coaxial connectors that use crimped or swaged compression elements.

It will further be appreciated that the features and components of the various embodiments described above may be further mixed and matched to provide yet additional embodiments of the present invention.

The present invention is described above with reference to the accompanying drawings. It will be appreciated, however, that this invention may be embodied in many different forms and should not be construed as limited to the embodiments set forth above; rather, these embodiments are provided so that this disclosure will be thorough and complete, and will fully convey the scope of the invention to those skilled in the art.

In the drawings, the size and/or relative positions of lines and elements may be exaggerated for clarity. It will also be understood that when an element is referred to as being "coupled," "connected," or "attached" to another element, it can be coupled, connected or attached directly to the other element, or intervening elements may also be present. In contrast, when an element is referred to as being "directly coupled" "directly connected," or "directly attached" to another element, there are no intervening elements present. The terms "front," "rear" and the like are used herein for the purpose of explanation only.

Unless otherwise defined, all technical and scientific terms used herein have the same meaning as commonly understood by one of ordinary skill in the art to which this invention belongs. The terminology used in the description herein is for the purpose of describing particular embodiments only and is not intended to be limiting of the invention. As used in the description and the appended claims, the singular forms "a," "an" and "the" are intended to include the plural forms as well, unless the context clearly indicates otherwise. As used herein, the term "and/or" includes any and all combinations of one or more of the associated listed items.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A coaxial connector, comprising:
a both assembly that includes a connector body and a contact post that is mounted at least partly within the connector body;
a nut; and
a conductive anti-friction bearing mechanism disposed between the body assembly and the nut,
wherein the body assembly is adapted to receive a central conductor of a coaxial cable within an interior of the contact post and adapted to receive an outer conductor of the coaxial cable between the contact post and the connector body, and wherein the nut includes an internal set of threads and an annular internal ring, and wherein the conductive anti-friction bearing mechanism is positioned between the internal set of threads and the annular internal ring.

2. The coaxial connector of claim 1, wherein the plurality of roller bearings comprise ball bearings.

3. The coaxial connector of claim 1, wherein the plurality of roller bearings comprise generally cylindrical bearings.

4. The coaxial connector of claim 1, wherein the conductive anti-friction bearing mechanism includes at least one sliding plane bearing.

5. The coaxial connector of claim 1, wherein the conductive anti-friction bearing mechanism provides a continuous electrical path between the body assembly and the nut.

6. The coaxial connector of claim 1, further comprising a moisture seal element, wherein the annular internal ring is between the conductive anti-friction bearing mechanism and the moisture seal element.

7. The coaxial connector of claim 1, wherein the coaxial connector is mounted on the coaxial cable to provide a terminated coaxial cable.

8. The coaxial connector of claim 1, wherein the conductive anti-friction bearing mechanism includes a plurality of roller bearings disposed between the contact post and the nut.

9. The coaxial connector of claim 8, wherein the conductive anti-friction bearing mechanism further comprises a retainer that positions the plurality of roller bearings at predetermined intervals from each other around a circumference of the body assembly.

10. The coaxial connector of claim 8, wherein at least one of the body assembly and the nut includes a plurality of roller bearing retention cavities, wherein the plurality of roller bearings are received within respective ones of the plurality of roller bearing retention cavities, and wherein the cavities are configured to position the plurality of roller bearings at predetermined intervals from each other around a circumference of the body assembly.

11. The coaxial connector of claim 8, wherein at least one of the body assembly and the nut includes a groove, and wherein the plurality of roller bearings are at least partly received within the groove.

12. The coaxial connector of claim 1, further comprising a locking mechanism that is configured to resist rotation of the nut once the nut is firmly threaded onto a mating female connector port.

13. The coaxial connector of claim 12, wherein the locking mechanism comprise a plurality of depressions in a surface of the body assembly or the nut that are configured to receive respective ones of the roller bearings once the nut is firmly threaded onto a mating female connector port.

14. A coaxial connector for terminating a coaxial cable that includes a central conductor and an outer conductor, the coaxial connector comprising:

a body assembly that includes a connector body and a contact post that is mounted at least partly within the connector body;

an internally-threaded nut that is mounted on an outer surface of the body assembly to extend forwardly from the body assembly, wherein the internally threaded nut is configured to rotate independent of the body assembly; and a locking mechanism that includes a plurality of elements disposed between the internally-threaded nut and the body assembly, wherein the plurality of elements are configured to lock within respective depressions in at least one of an inner surface of the internally-threaded nut or an outer surface of the body assembly when the internally-threaded nut is firmly threaded onto a mating female connector port, wherein the body assembly is adapted to receive the coaxial cable, wherein the body assembly is electrically connected to the outer conductor of the coaxial cable, and wherein the nut includes an internal set of threads and an annular internal ring and wherein a conductive anti-friction bearing mechanism is positioned between the internal set of threads and the annular internal ring.

15. The coaxial connector of claim 14, wherein the nut partially covers the connector body and the contact post.

16. The coaxial connector of claim 14, wherein the nut locking mechanism does not resist the rotation of the nut in either a clockwise or counter-clockwise direction until the internally-threaded nut is firmly threaded onto a mating female connector port.

17. The coaxial connector of claim 14, wherein the plurality of elements comprise roller bearings.

18. The coaxial connector of claim 17, wherein the roller bearings comprise a plurality of ball bearings that are positioned within a retainer.

19. The coaxial connector or claim 17, wherein the depressions comprise partially spherical depressions.

20. A method of providing a ground plane conduction path through a coaxial connector that includes a connector body, a contact post, and an internally-threaded nut, the method comprising:

providing a conductive anti-friction bearing mechanism between the contact post and the internally-threaded nut that provides a continuous electrical connection between the contact post and the internally-threaded nut, the electrical connection being part of the ground plane conduction path, wherein the nut includes an internal set of threads and an annular internal ring, and wherein the conductive anti-friction bearing mechanism is positioned between the internal set of threads and the annular internal ring.

21. The method of claim 20, wherein the conductive anti-friction bearing mechanism comprises a plurality of roller bearings.

* * * * *